(12) United States Patent
Sakai et al.

(10) Patent No.: US 6,253,133 B1
(45) Date of Patent: Jun. 26, 2001

(54) SITTING STATE DETECTOR

(75) Inventors: Morio Sakai, Toyota; Koji Ito, Aichi-ken; Osamu Fujimoto, Nisshin; Makoto Hamada, Toyota, all of (JP)

(73) Assignees: Aisin Seiki Kabushiki Kaisha, Kariya; Toyota Jidosha Kabushiki Kaisha, Toyota, both of (JP)

( * ) Notice: Subject to any disclaimer, the term of this patent is extended or adjusted under 35 U.S.C. 154(b) by 0 days.

(21) Appl. No.: 09/570,558

(22) Filed: May 12, 2000

(30) Foreign Application Priority Data

May 13, 1999 (JP) .................................................. 11-132632

(51) Int. Cl.$^7$ ...................................................... B60R 21/00
(52) U.S. Cl. ......................... 701/45; 180/268; 180/271; 180/272; 280/735; 280/732; 280/734
(58) Field of Search .............................. 701/45; 180/273, 180/268, 271, 272; 280/732, 734, 735

(56) References Cited

U.S. PATENT DOCUMENTS

| | | | |
|---|---|---|---|
| 5,413,378 | * 5/1995 | Steffens, Jr. et al. | ................. 280/735 |
| 5,482,314 | 1/1996 | Corrado et al. . | |
| 5,612,876 | 3/1997 | Zeidler et al. | .......................... 701/45 |
| 5,702,123 | 12/1997 | Takahashi et al. | .................... 280/735 |
| 5,722,686 | 3/1998 | Blackburn et al. . | |
| 5,732,375 | 3/1998 | Cashler . | |
| 5,739,757 | 4/1998 | Gioutsos . | |
| 5,948,031 | * 9/1999 | Jinno et al. | ............................. 701/45 |
| 6,056,079 | 5/2000 | Cech et al. . | |
| 6,070,115 | 5/2000 | Oestreicher et al. . | |
| 6,101,436 | 8/2000 | Fortune et al. . | |
| 6,138,067 | 10/2000 | Cobb et al. . | |
| 6,158,768 | 12/2000 | Steffens, Jr. et al. . | |

FOREIGN PATENT DOCUMENTS

| | | |
|---|---|---|
| 5-116589 | 5/1993 | (JP) . |
| 7-89150 | 9/1995 | (JP) . |
| 7-270541 | 10/1995 | (JP) . |
| 7-285364 | 10/1995 | (JP) . |
| 8-72665 | 3/1996 | (JP) . |
| 8-268220 | 10/1996 | (JP) . |
| 10-236269 | 9/1998 | (JP) . |
| 10-297422 | 11/1998 | (JP) . |

* cited by examiner

Primary Examiner—William A. Cuchlinski, Jr.
Assistant Examiner—Marthe Y. Marc-Coleman
(74) Attorney, Agent, or Firm—Burns, Doane, Swecker & Mathis, LLP

(57) ABSTRACT

A sitting state detector of the present invention has an electrode which is installed in a seat back and which has a capacitance fluctuating depending on whether or not a passenger sits in a normal posture, conversion means for generating an electric signal corresponding to the capacitance, means which detects predetermined changes in the electric signal and which generates a detection signal indicative of whether or not the passenger sits in the normal posture, a sitting state sensor for a seat cushion, and control means which adjusts the conversion means for standardizing the electric signal at intervals of a short period and by a great amount in the absence of a sitting passenger and which adjusts the conversion means at intervals of a long period and by a small amount in the presence of a sitting passenger.

21 Claims, 14 Drawing Sheets

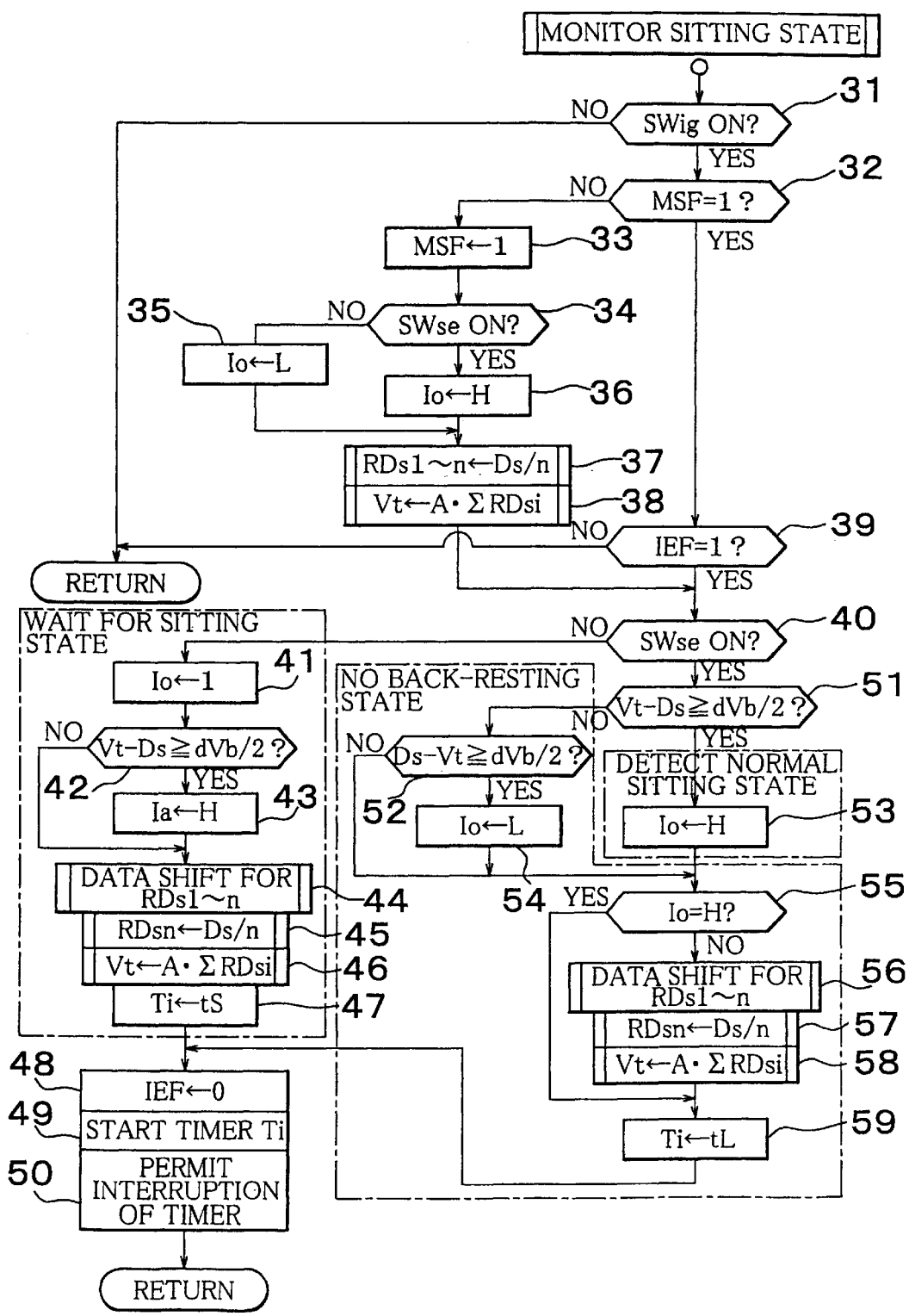

SITTING STATE DETECTOR

The disclosure of Japanese Patent Application No. HEI 11-132632 filed on May 13, 1999 including the specification, drawings and abstract is incorporated herein by reference in its entirety.

BACKGROUND OF THE INVENTION

1. Field of the Invention

The present invention relates to a detector for detecting whether or not a passenger sits in a normal posture on a seat having a seat cushion supporting the passenger thereon and a seat back supporting the back of the passenger, that is, whether or not a passenger sits at a suitable position on the seat cushion with his or her back resting at a suitable position on the seat back. In a non-limitative manner, the present invention relates to a passenger sitting state detector for monitoring the presence of a passenger sitting in a normal posture on a vehicular seat for the purpose of preventing the passenger from hitting an object by means of an air bag in the case of a collision of a vehicle.

2. Description of the Related Art

An air bag device which is designed for protection of a passenger in a vehicle and which deploys an air bag in case of a collision of the vehicle has been in practical use. However, when there is a passenger sitting in a certain posture or state, even such an air bag device may not be able to provide effective protection. For example, in an air bag device which is designed for front collision and which deploys an air bag between a passenger and an instrument panel to protect the passenger, if the air bag is deployed when the passenger is located at a position close to the instrument panel such as a front end of the seat, it is impossible to ensure a sufficient space for deployment of the air bag and a sufficient length of time for contact of the passenger with the air bag. As a result, the air bag device cannot provide effective protection.

In recent years, it is not rare to see an air bag device installed in a front seat (a passenger seat) next to a driver seat. Once the air bag is deployed, it cannot be reused with ease. Hence, especially in the case of such an air bag, it is preferable to impose restrictions on the operation of the air bag so that it is deployed only when there is a passenger sitting on the passenger seat.

For example, Japanese Patent Application Laid-Open No. HEI 7-285864 discloses a device which detects the presence of a passenger sitting at an unsuitable position for deployment of an air bag, such as a front end of a seat, by means of pressure sensors disposed in front and rear portions of a seat cushion and which issues a warning to the passenger.

Although Japanese Published Patent No. HEI 7-89150 and Japanese Patent Application Laid-Open No. HEI 7-270541 do not particularly relate to an air bag, these publications disclose a device for detecting the presence of a passenger by means of a sensor which detects changes in dielectric constant of a dielectric material installed in a seat cushion. In a short-range sensor for monitoring changes in capacitance, a short-range detection electrode (ATs) changes in capacitance due to environmental changes around a sensor portion (soaking in water, changes in humidity and the like). Especially in the case where the short-range sensor is installed in a vehicular seat, changes in humidity tend to cause changes in capacitance and thus bring about a failure of detection. In the short-range sensor disclosed in Japanese Published Patent No. HEI 7-89150, the facts that environmental changes such as changes in humidity cause gradual changes in capacitance and that changes in distance between a person and the sensor cause abrupt changes in capacitance are taken into account. That is, an electric signal corresponding to a capacitance is smoothened in a time-series manner to create a threshold value. If the electric signal exceeds the level of the threshold value, the sensor switches from a detection signal indicative of the presence of a person to a detection signal indicative of the absence of a person or vice versa. In Japanese Patent Application Laid-Open No. HEI 7-270541, a third electrode is added, and three capacitance values among the respective electrodes are calculated. Based on these capacitance values, only those changes in capacitance which are relevant to the posture of a passenger and unsusceptible to environmental changes are calculated.

Furthermore, Japanese Patent Application Laid-Open No. HEI 8-268220 discloses a device which detects the presence of a passenger or a close positional relation between the passenger and an instrument panel, and which changes an operating state of an air bag according to a result of the detection.

By the way, in recent years, apart from the air bag device designed for front collision, a side air bag device for protection of a passenger against a side collision has also been proposed and put into practice. In general, such a side air bag device is installed in a lateral portion of a seat back or a vehicular door.

FIG. 14 shows a child CHL sitting on a front seat (a passenger seat) next to a vehicular driver seat. In a vehicular seat SE shown in FIG. 14, a lateral portion of a seat back SEb on the side of a front-left door DfL has an opening SEso which is covered with a lid and which is designed for deployment of a side air bag. If an impact sensor integrated into a center pillar detects an impact in a direction perpendicular to the longitudinal axis of a vehicle to be sensed, for example, due to a collision of another vehicle with the door DfL, an ECU (an electronic control unit mainly composed of a CPU) installed in a center tunnel portion of the vehicle makes a judgment on the necessity to deploy the side air bag. If it is judged that the side air bag needs to be deployed, the ECU supplies a driver for the side air bag device in the seat back SEb with a signal indicative of activation. Then the driver supplies an activation circuit with electric current, thus activating the air bag. Thereby the side air bag is deployed and travels towards the front of the vehicle through the opening SEso in an expanding manner. However, when the child CHL leans against the door DfL as indicated by a solid line, even if the side air bag is deployed, it does not enter a space between the passenger (CHL) and the door DfL. Therefore, there is no need to deploy the side air bag. When the passenger (CHL) sits in a normal posture as indicated by an alternate long and two short dashes line, deployment of the side air bag is expected to produce a beneficial effect.

Whether the air bag device for front collision or the side air bag for side collision is used, deployment of the air bag at the time of a collision does not produce a sufficiently beneficial effect unless the passenger to be protected sits in a posture conceived by a designer of the air bag (hereinafter referred to as a normal posture, a correct posture or a predetermined posture). In the short-range sensor disclosed in Japanese Published Patent No. HEI 7-89150, only one detection electrode is provided in a seat cushion to simply detect whether or not there is a passenger sitting on a seat cushion. Thus, it is impossible to detect whether or not the passenger sits in a normal posture with respect to the seat back. According to Japanese Patent Application Laid-Open No. HEI 7-270541, a seat cushion and a seat back are provided with a first electrode and a third electrode respectively (an equipment ground portion such as a vehicle body serves as a second electrode) to detect three capacitance values. These capacitance values are used to calculate changes in capacitance caused by the passenger. Thus, it is again impossible to detect whether or not the passenger sits in a normal posture with respect to the seat back.

SUMMARY OF THE INVENTION

It is a first object of the present invention to automatically detect whether or not there is a passenger sitting in a normal posture on a seat having a seat cushion supporting the passenger thereon and a seat back supporting the back of the passenger. It is a second object of the present invention to enhance the reliability of the detection.

In a first aspect of the present invention, there is provided a sitting state detector comprising a short-range sensor having a short-range detection electrode which is installed in a seat back that supports a back of a passenger and that belongs to a seat having a seat cushion for supporting the passenger thereon and which has a capacitance fluctuating depending on whether or not the back of the passenger is at a predetermined position with respect to the seat back, physical quantity conversion means for generating an electric signal corresponding to the capacitance of the electrode, and detection signal means which detects predetermined changes in the electric signal and which generates a detection signal indicative of whether or not the back of the passenger is at the predetermined position, a sitting state sensor which is provided in the seat cushion and which is different from the short-range sensor in passenger detection mechanism, and control means for changing an adjustment speed for conversion characteristics of the physical quantity conversion means in accordance with a detection state of the sitting state sensor.

When a passenger sits on the seat, the weight of the passenger is applied to the seat cushion. Hence, as the sitting state sensor, it is possible to use a so-called mechanical sitting state sensor, for example, of a micro-switch type or a conductor-print-sheet type, wherein electric contacts, opposed conductor wires or conductor sheets come into mechanical contact in response to a load. By providing the sitting state sensor at a suitable position in the seat cushion, it becomes possible to precisely detect whether or not the passenger is located at the suitable position based on an on-off state of the switch.

For example, in the case where it is detected whether or not the passenger sits in a normal posture to estimate the availability of effective protection through deployment of the air bag, even if the aforementioned mechanical switch is installed in the seat back, it may not be possible to precisely detect whether or not the passenger sits in a normal posture with respect to the seat back. That is, the mechanical switch is not switched from off to on unless a load equal to or greater than a predetermined value is applied thereto. However, for example, even though the passenger does not lean his or her back against the seat back, the passenger may be located close enough to the seat back to deploy the air bag (in a normal posture). Nevertheless, in this case, the mechanical switch remains off (and thus indicates a postural abnormality).

In the first aspect of the present invention, the short-range detection electrode and the physical quantity conversion means constitute the short-range sensor which detects the presence or absence of a passenger by monitoring changes in capacitance. Thus, even if the passenger does not lean his or her back against the seat back, it is detected whether or not the passenger sits in a normal posture. Also in this respect, it is possible to achieve high reliability in postural detection.

However, in the case of the short-range sensor, the reliability of detection may deteriorate due to environmental changes such as changes in humidity. Thus, according to the first aspect of the present invention, the sitting state sensor installed in the seat cushion is utilized to change an adjustment speed for conversion characteristics of the physical quantity conversion means in accordance with a state of detection (presence/absence of a sitting passenger). For example, while the sitting state sensor detects the absence of a sitting passenger, a capacitance detection signal is corrected at a high speed. This modifies a shift in capacitance detection signal caused by soaking in water or changes in humidity at a high speed. Even if this modification is made at a speed approximately equal to a speed of change in distance between the passenger and the short-range detection electrode, the sitting state sensor detects the absence of a sitting passenger. For this reason, the change in signal level caused by the modification does not counterbalance the change in signal level caused by changes in distance between the passenger and the seat back.

While the sitting state sensor detects the presence of a sitting passenger, there may be a passenger sitting in an abnormal posture with his or her back out of contact with the seat back, or there may be an object laid on the seat back with no sitting passenger. In the case where there is a sitting passenger, if adjustment (correction) for modification of a shift in the capacitance detection signal caused by soaking in water or changes in humidity is carried out at a high speed, the adjustment may counterbalance changes in signal level caused by changes in distance between the passenger and the short-range detection electrode. To prevent the occurrence of such a phenomenon, it is desirable to carry out the adjustment at a low speed. This eliminates the possibility of a failure of detection, and ensures high precision and high reliability in automatically detecting whether or not the passenger sits in a normal posture.

In the aforementioned aspect, the control means may be designed to increase a period for adjustment of the conversion characteristics of the physical quantity conversion means and reduce an amount of adjustment if the sitting state sensor detects the presence of a sitting passenger, and to reduce a period for adjustment and increase an amount of adjustment if the sitting state sensor detects the absence of a sitting passenger.

In this construction, while the sitting state sensor detects the absence of a sitting passenger, the physical quantity conversion means of the short-range sensor is corrected at a high speed, and the conversion characteristics are modified in quick response to a shift in the capacitance detection signal caused by environmental changes. In the presence of a sitting passenger, the conversion characteristics are modified at a low speed. Therefore, the change in signal level caused by changes in distance between the passenger and the electrode cannot be counterbalanced.

In the aforementioned aspect, the control means may be designed to refrain from the adjustment of the conversion characteristics of the physical quantity conversion means while there is a signal indicative of a normal position generated by the detection signal generation means.

If a modification for bringing the capacitance detection signal close to a standard value or a reference value is made over a long period of time even while there is a detection signal indicative of a passenger sitting at a normal position, the amount of modification becomes excessive, or the amount of change in the capacitance detection signal caused by the back of the passenger resting on the seat back is counterbalanced. Hence, it may mistakenly be concluded that there is no passenger. This aspect of the present invention can eliminate the possibility of such a failure of detection.

In a second aspect of the present invention, there is provided a sitting state detector comprising a short-range detection electrode which is installed in a seat back that supports a back of a passenger and that belongs to a seat having a seat cushion for supporting the passenger thereon and which has a capacitance fluctuating depending on whether or not the back of the passenger is at a predetermined position with respect to the seat back, physical quantity conversion means for generating an electric signal corresponding to the capacitance of the electrode, means which calculates a threshold value based on a time-series average of the electric signal and switches, in response to detection of a change in the electric signal across a level of the threshold value, a detection signal indicative of whether or not the passenger is at a normal position, a sitting state sensor for detecting "presence"/"absence" of an object on the seat cushion, and control means which performs an updating operation at a high speed through the calculation of the threshold value if the sitting state sensor detects "absence" and which performs an updating operation at a low speed if the sitting state sensor detects "presence".

Unlike the first aspect wherein the capacitance detection signal is modified (corrected), the threshold value is modified in the second aspect. That is, while the sitting state sensor detects absence of a sitting passenger, the threshold value is changed at a high speed in response to changes in the capacitance detection signal. Thus, the threshold value is modified at a high speed in accordance with soaking in water or changes in humidity. Even if this modification is made at a speed approximately equal to a speed of changes in distance between the passenger and the short-range detection electrode, the sitting state sensor detects the absence of a sitting passenger. Therefore, no problem is caused.

While the sitting state sensor detects the presence of a sitting passenger, there may be a passenger sitting in an abnormal posture with his or her back out of contact with the seat back, or there may be an object laid on the seat back with no sitting passenger. In the case where there is a sitting passenger, if modification of the threshold value is made at a high speed in accordance with a shift in the capacitance detection signal caused by soaking in water or changes in humidity, there is a possibility of overlooking changes in distance between the passenger and the short-range detection electrode. To prevent the occurrence of such a phenomenon, adjustment is carried out at a low speed. This eliminates the possibility of a failure of detection, and ensures high precision and high reliability in automatically detecting whether or not the passenger sits in a normal posture.

In the second aspect, the control means may be designed to refrain from updating of the threshold value while there is a signal indicative of a normal position generated by the detection signal generation means.

If the threshold value is modified in accordance with changes in the capacitance detection signal over a long period of time even while there is a detection signal indicative of a passenger sitting at a normal position, it may mistakenly be concluded that there is no passenger. This aspect of the present invention can eliminate the possibility of such a failure of detection.

In the aforementioned aspects, the short-range detection electrode may be accommodated inside a skin of the seat back.

In the first aspect, the physical quantity conversion means may include an oscillation circuit which oscillates at a frequency corresponding to a capacitance of the short-range detection electrode, means for generating a capacitance detection signal indicative of a voltage proportional to the oscillation frequency, and means for changing the oscillation frequency of the oscillation circuit in accordance with the indicated voltage, and the control means may be designed to adjust the oscillation frequency at the indicated voltage to adjust the conversion characteristics of the physical quantity conversion means.

In the aforementioned aspects, the control means may be designed to change the indicated voltage at intervals of a short period by more than an indicated voltage change amount causing changes in unit amount of the capacitance detection signal if the sitting state sensor detects "absence" of a sitting passenger, and to change the indicated voltage at intervals of a long period by the indicated voltage change amount causing changes in unit amount of the capacitance detection signal if the sitting state sensor detects "presence" of a sitting passenger.

In the second aspect, the physical quantity conversion means may include an oscillation circuit which oscillates at a frequency corresponding to a capacitance of the short-range detection electrode and means for generating a capacitance detection signal indicative of a voltage proportional to the oscillation frequency.

In the first and second aspects, the sitting state sensor may be designed as a sitting state switch having the following features. That is, the sitting state sensor is shaped like a cardboard and is integrally formed of two thin resin sheets with a relatively thin spacer interposed therebetween, and conductive foils are joined to the resin sheets. The spacer has a plurality of perforations and is joined to the sheets. If there is a passenger sitting on the seat cushion, the two thin resin sheets are deflected so that the conductive foils fall into the perforations in the spacer and come into contact with each other. If the passenger gets to his or her feet from the seat cushion, the two thin resin sheets are flattened again owing to their rigidity so that the conductive foils are brought out of contact with each other.

In a third aspect of the present invention, there is provided a sitting state detector comprising a first sensor, a second sensor, a third sensor and judgment means. The first sensor has a short-range detection electrode which is installed in an upper portion of a seat back that supports a back of a passenger and that belongs to a vehicular seat having a seat cushion for supporting the passenger thereon and accommodating in a lateral portion of the seat back a side air bag deployed between a lateral portion of a vehicle body and a lateral portion of the passenger to protect the passenger and which has a capacitance fluctuating depending on whether or not the back of the passenger is at a predetermined position with respect to the seat back, and has physical quantity conversion means for generating an electric signal corresponding to the capacitance of the electrode. The first sensor detects whether or not the passenger sits in a predetermined posture. The second sensor is provided close to a side air bag accommodating portion of the lateral portion of the seat back and detects whether or not part of a body of the passenger is located close to the side air bag. The third sensor, which is of load-detection type, is provided in the seat cushion and detects whether or not there is a sitting passenger. The judgment means judges permissibility of activation of the side air bag based on detection signals from the first, second and third sensors.

As will be described below, this construction makes it possible to precisely detect whether or not the passenger sits in a normal posture.

Case a.

If the third sensor detects the presence of a sitting passenger, if the first sensor detects a predetermined posture of the passenger, and if the second sensor fails to detect the body of the passenger, it is concluded that the passenger sits in a normal posture.

Case b.

If the third sensor detects the presence of a sitting passenger, if the first sensor fails to detect a predetermined posture of the passenger, and if the second sensor detects the body of the passenger, it is concluded that the passenger sits in an abnormal posture.

Case c.

If the third sensor detects the absence of a sitting passenger, it is concluded that there is no sitting passenger.

In the third aspect, the sitting state detector may further comprise control means for correcting conversion characteristics of the physical quantity conversion means when the third sensor detects absence of a sitting passenger.

In this construction, a shift in the electric signal of the physical quantity conversion means caused by environmental changes is corrected in the absence of a sitting passenger. Thus, it is possible to achieve high reliability in detecting the presence of a sitting passenger.

In the third aspect, the sitting state detector may further comprise control means for correcting the conversion characteristics of the physical quantity conversion means when the second sensor detects that part of the body of the passenger is located close to the side air bag.

In this construction, a shift in the electric signal of the physical quantity conversion means is corrected when the body of the passenger is located outside the range of the first sensor. For example, even in the case where a wet towel is hung in the vicinity of the electrode portion after the body of the passenger has been spaced far apart from the electrode of the first sensor, the electric signal is corrected to indicate the presence of the towel. When the passenger assumes a correct posture again, it is possible to precisely detect a change into the correct posture despite the presence of the towel.

In the third aspect, in a case where a threshold value which is referred to for the first sensor to detect whether or not there is a passenger sitting in a predetermined posture is set to a sensitive level, when the first sensor detects that the passenger sits in the predetermined posture, the control means may set the threshold value to an insensitive level and again detect by means of the first sensor whether or not there is a passenger sitting in a predetermined posture if the second sensor detects presence of part of a body of the passenger.

In this construction, it is possible to distinguish between the case where a wet towel is hung in the vicinity of the electrode of the first sensor and the case where the passenger makes a temporary movement. Thus, movements of the passenger can precisely be detected.

In the third aspect, the sitting state sensor may further comprise control means which refers to detection of the third sensor at intervals of a predetermined period while a vehicular ignition key switch is off and which corrects the conversion characteristics of the physical quantity conversion means when the third sensor detects absence of a sitting passenger.

In this construction, the physical quantity conversion means is adjusted to postural characteristics corresponding to an environment at the time of take-off of the vehicle. Therefore, it is possible to detect with high reliability whether or not the passenger sits in a suitable posture.

Further objects and features of the present invention will become apparent from the following description of preferred embodiments with reference to the accompanying drawings.

BRIEF DESCRIPTION OF THE DRAWINGS

FIG. 6 is a flowchart showing a sitting state monitoring function of a CPU 11 shown in FIG. 5.

DETAILED DESCRIPTION OF PREFERRED EMBODIMENTS

[First Embodiment]

Figure 1:
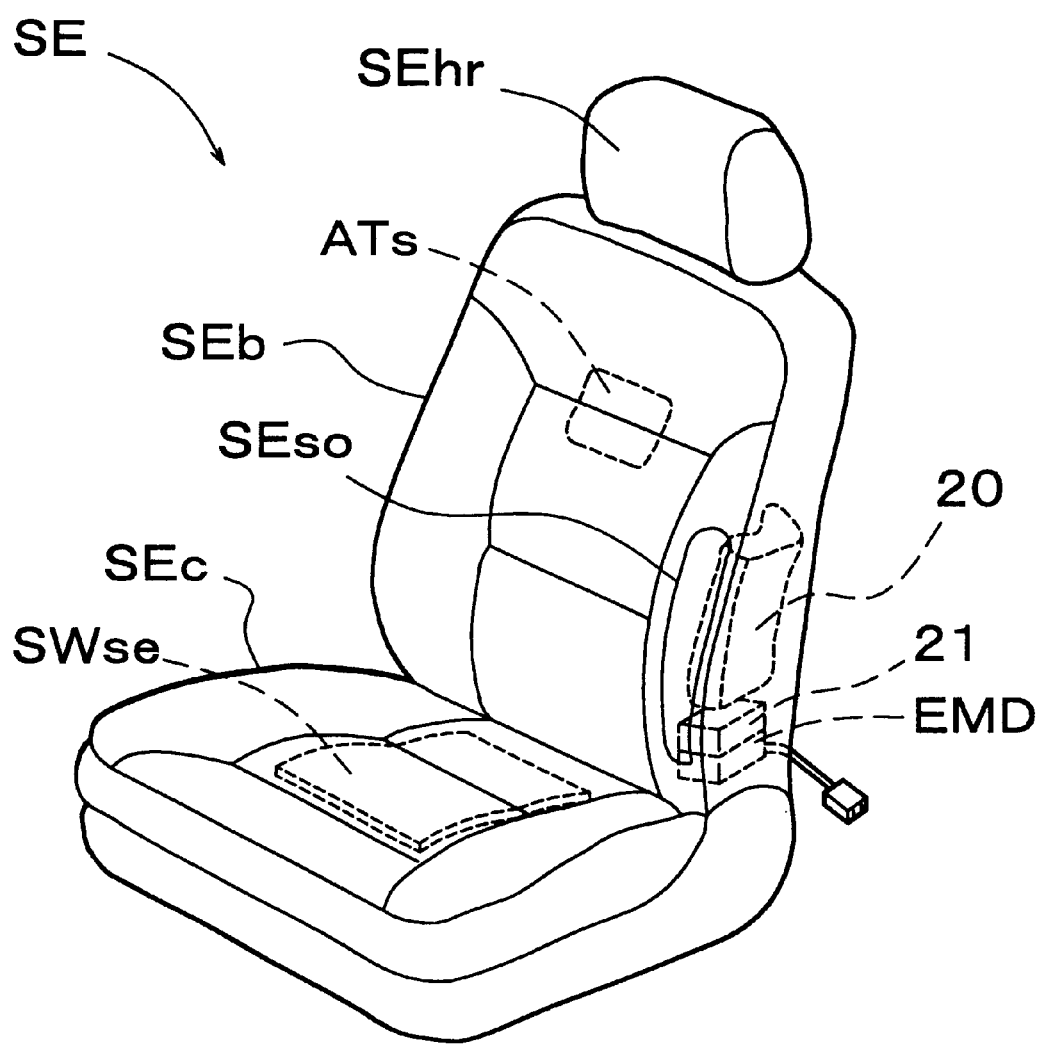
FIG. 1 is a perspective view of an external appearance of a vehicular seat to which the present invention is applied.
Figure 14:
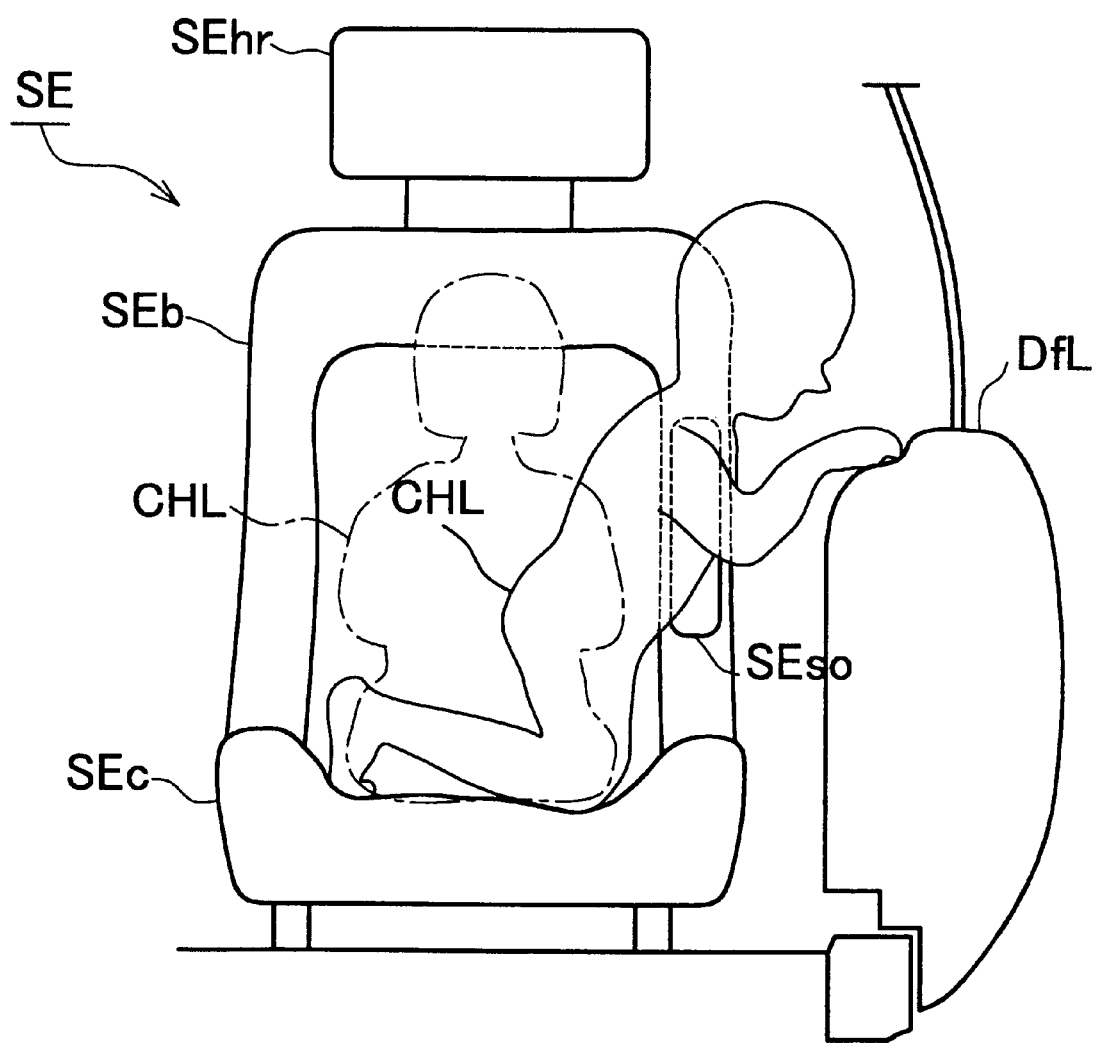
FIG. 14 is a front view of a vehicular front-left seat equipped with a side air bag and a child CHL sitting thereon.

FIG. 1 schematically shows an external appearance of a vehicular seat SE which is to be monitored as to whether or not there is a passenger sitting in a normal posture. This seat SE is a front seat (a passenger seat) located to the left of a driver seat. In a door-side (a front-left door DfL: FIG. 14) lateral portion of a seat back SEb, a side air bag 20 is accommodated inside a cover for closing an opening SEso opposed to a front window. An air bag driver 21 is connected to the side air bag 20.

A sitting state sensor SWse is disposed on the back side of (i.e. inside) an upper skin of a seat cushion SEc. The sitting state sensor SWse has the shape of a cardboard and is integrally formed of two thin resin sheets with a relatively thin spacer interposed therebetween. Conductive foils are joined to the resin sheets. The spacer has a plurality of perforations and is joined to the sheets. In this sitting state sensor SWse, if there is a passenger sitting on the seat cushion SEc, the two thin resin sheets are deflected so that the conductive foils fall into the perforations in the spacer and come into contact with each other. This means a switch-on state and detection of the presence of a sitting state. If the passenger gets to his or her feet from the seat cushion SEc, the two thin resin sheets are flattened again owing to their rigidity. Then the conductive foils are brought out of contact with each other. This means a switch-off state and detection of the absence of a sitting state.

The seatback SEb of the seat SE has a skin for contact with the back of a passenger. An antenna electrode ATs is stuck on the back side of (i.e. inside) the skin. The antenna electrode ATs is a thin resin sheet to which a conductive foil is joined. When an adult sits on this seat, his or her head is as high as a headrest SEhr. In this state, the antenna electrode ATs is opposed to a portion of his or her back which is located in height between his or her chest and brain.

Figure 2:
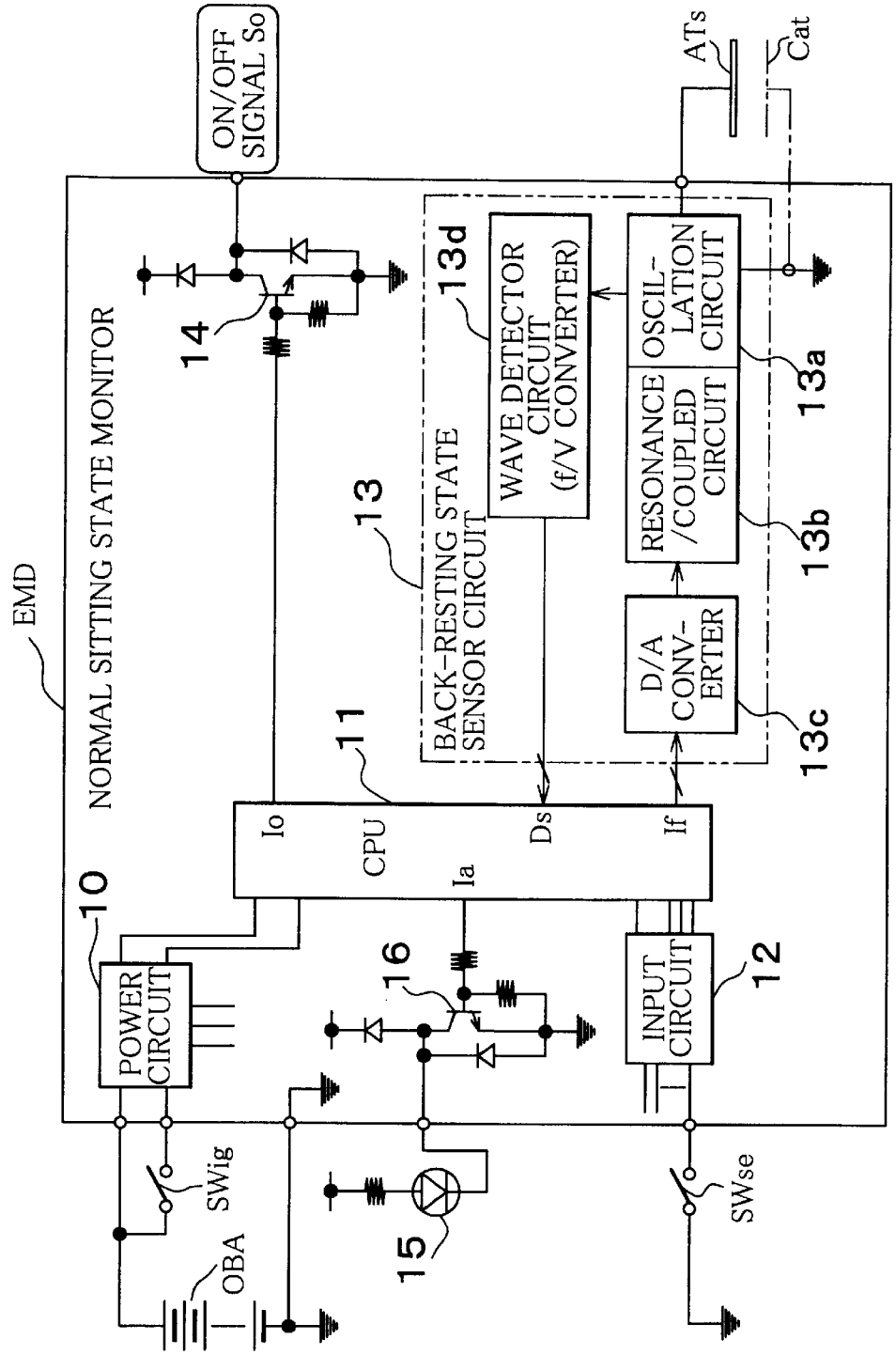
FIG. 2 is a block diagram of a construction in accordance with a first embodiment of the present invention.

FIG. 2 shows a first embodiment of the present invention in which the sitting state sensor SWse and the antenna electrode ATs shown in FIG. 1 are connected. The sitting state sensor SWse and the antenna electrode ATs are respectively connected to an input circuit 12 and a back-resting state sensor circuit 13 in a sitting state monitor EMD. In FIG. 2, the antenna electrode ATs is opposed to an electrode Cat indicated by an alternate long and two short dashes line. The electrode Cat comprehensively represents those electric conductors which are at a ground potential of the apparatus and which have an effect on a ground capacitance of the antenna electrode ATs. The electrode Cat includes a vehicular roof and a vehicular floor, and is hypothetically shown as an opposed electrode at a ground potential. The electrode Cat will hereinafter be referred to as a ground electrode.

A voltage of a battery OBA designed as an on-board power source is directly applied to a stand-by power circuit in a power circuit 10. This voltage is also applied to a constant power circuit in the power circuit 10 through an ignition key switch SWig. The stand-by power circuit in the power circuit 10 supplies a stand-by operating voltage to a CPU 11. The stand-by operating voltage is required to maintain data in an internal memory of the CPU 11, monitor signal levels at input ports, and process the data. If the ignition key switch SWig is turned on, the constant power circuit in the power circuit 10 applies an operating voltage to all the circuits in the monitor EMD and a voltage-application end of a light-emitting diode 15. A signal indicative of whether or not an operating voltage is outputted from the constant power circuit is applied to the CPU 11. The CPU 11 monitors a level of the signal and judges whether the ignition key switch SWig is on (an operating voltage is outputted from the constant power circuit) or off (there is no operating voltage).

The back-resting state sensor circuit 13 has an oscillation circuit 13a, a resonance/coupled circuit 13b, a D/A converter 13c and a wave detector circuit (a f/V converter) 13d. The oscillation circuit 13a oscillates at a frequency corresponding to a capacitance between the antenna electrode ATs and the ground electrode Cat. The resonance/coupled circuit 13b adjusts oscillation frequencies and is connected to a CLR circuit which determines an oscillation frequency of the oscillation circuit 13a. The D/A converter 13c supplies a frequency control voltage Vf to the circuit 13b. The wave detector circuit 13d converts a frequency of an oscillation signal of the oscillation circuit 13a into a voltage. The resonance/coupled circuit 13b has an induction coil and a series circuit composed of a capacitor and a variable-capacitance diode. A primary side of the induction coil is connected to the CLR circuit in the oscillation circuit 13a. The series circuit is connected to a secondary side of the induction coil L. The antenna electrode ATs is connected to the series circuit, and the frequency control voltage Vf is applied to the capacitor side of the series circuit. Due to changes in the control voltage Vf, the variable-capacitance diode changes in capacitance, the secondary side of the resonance/coupled circuit changes in permissible electric capacity, the CLR circuit in the oscillation circuit 13a changes in impedance, and the oscillation circuit 13a changes in oscillation frequency (resonance frequency).

The CPU 11 supplies the D/A converter 13c with data indicative of a control voltage Vf. A voltage which is generated by the wave detector circuit 13d and which indicates an oscillation frequency of the oscillation circuit 13a is applied to an A/D conversion input port of the CPU 11. The CPU 11 reads the voltage through digital conversion. Data on a digital-converted voltage indicative of an oscillation frequency of the oscillation circuit 13a will hereinafter be referred to as oscillation frequency data Ds.

When a passenger has his or her back in close contact with the seat back SEb, the capacity between the antenna electrode ATs and the ground electrode Cat is large, the oscillation frequency of the oscillation circuit 13a is low, the voltage indicative of the oscillation frequency is low, and the oscillation frequency data Ds assume a small value. If the passenger gets off from the seat back SEb, the capacitance between the antenna electrode ATs and the ground electrode Cat decreases, the oscillation frequency of the oscillation circuit 13a increases, the voltage indicative of the oscillation frequency increases, and the oscillation frequency data Ds assume a great value. If the humidity around the antenna electrode ATs is high, the capacitance between the antenna electrode ATs and the ground electrode Cat is large. On rainy days or during a rainy season, the oscillation frequency data Ds assume a small value. On the contrary, when the humidity is low, the oscillation frequency data Ds assume a great value.

In the first embodiment, the CPU 11 compares the oscillation frequency data Ds with a threshold value Vt (a set value: a fixed value). If the data Ds assume a value equal to or smaller than the threshold value Vt, it is determined that the passenger has his or her back resting at a suitable position on the seat back SEb (that the passenger sits in a normal posture). The CPU 11 then outputs an output signal $I_0$ of H and turns an output transistor 14 on. That is, an output signal So is at a low level L. If the data Ds assume a value greater than the threshold value Vt, it is determined that the passenger does not have his or her back resting at a suitable position on the seat back SEb (that the passenger sits at an abnormal position). The CPU 11 then outputs an output signal $I_0$ of L and turns the output transistor 14 off. That is, the output signal So is at a high level H.

In this embodiment, an equipment ground connection end of an ignition (trigger) current-carrying wire for the driver 21 of the air bag 20 is connected to an output terminal of the signal So. When the signal So is at L (when the transistor 14 is conductive), if the driver 21 turns a trigger for deployment of the air bag (a current-carrier for ignition) on, the transistor 14 provides a current-carrying path so that electric current flows through an igniter and that the air bag is deployed. However, when the signal So is at H (when the transistor 14 is non-conductive), even if the driver 21 turns the trigger for deployment of the air bag (the current-carrier for ignition) on, the current-carrying path is shut off by the transistor 14. Therefore, the igniter is not supplied with electric current (the igniter is not activated) so that the air bag is not deployed.

As described above, the oscillation frequency data Ds change depending on environmental changes such as changes in humidity around the antenna electrode ATs. For this reason, if the oscillation frequency data Ds are compared with the fixed threshold value to determine whether or not the passenger has his or her back resting at a suitable position on the seat back SEb, the occurrence of misjudgment is highly probable. Thus, it is necessary to make such a correction that the oscillation frequency data Ds in the absence of a passenger is adjusted to a standard value Vtm.

In the presence of a state that cannot occur from the standpoint of the logic of detecting a normal posture determined in the CPU 11, the light-emitting diode 15 detects the occurrence of an abnormality in one of the sitting state sensor SWse, the antenna electrode ATs and the monitor EMD and issues a warning of the abnormality. If the CPU 11 outputs an output signal Ia of H, an output transistor 16 becomes conductive and the light-emitting diode 15 is lit up. This lighting-up means the occurrence of an abnormality in the apparatus. If the CPU 11 again outputs an output signal Ia of L, the output transistor 16 again becomes non-conductive and the light-emitting diode 15 stops emitting light.

Figure 3:
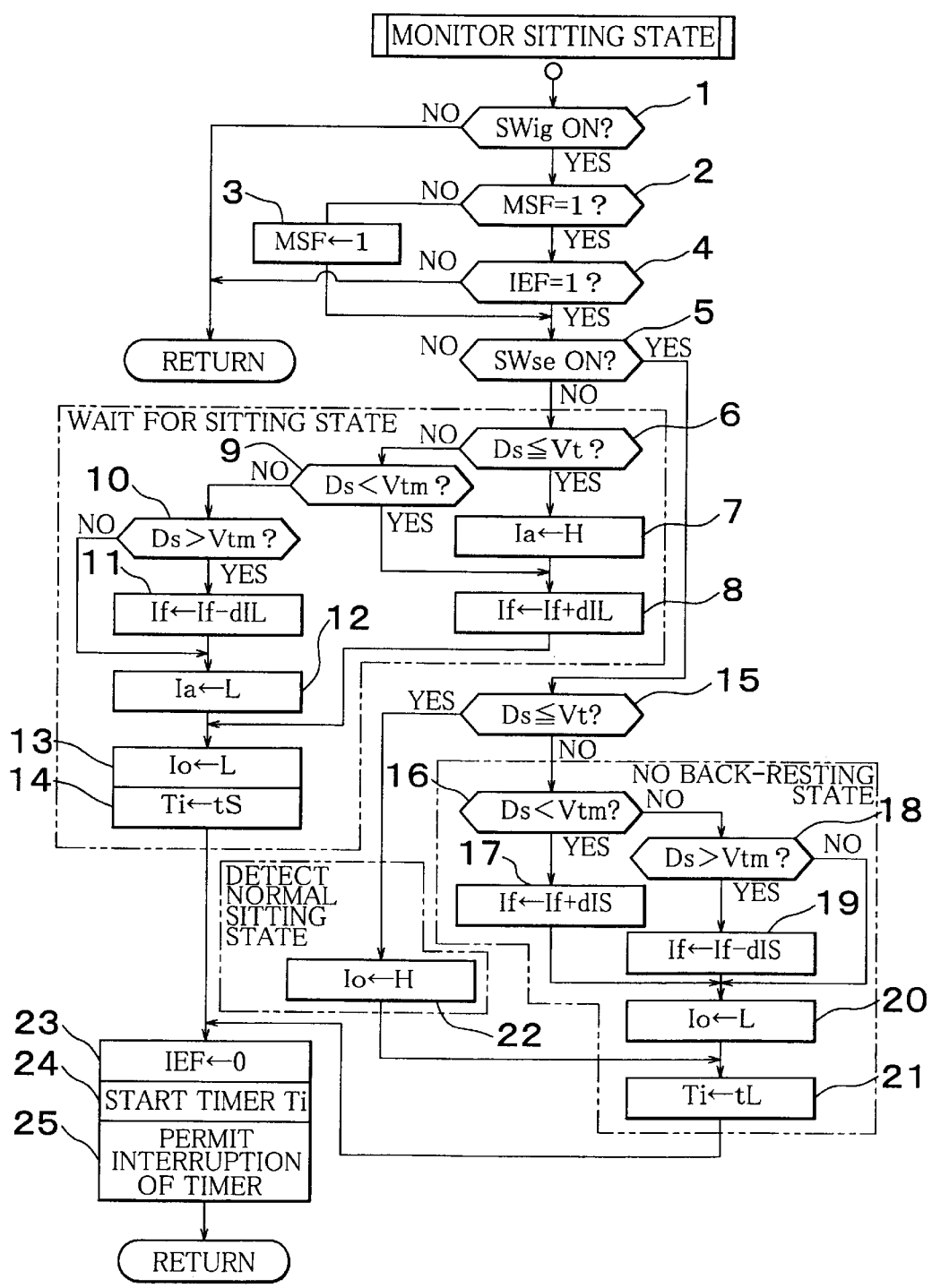
FIG. 3 is a flowchart showing a sitting state monitoring function of a CPU 11 shown in FIG. 2.

FIG. 3 shows the overall processings of "sitting state monitoring" performed by the CPU 11. While the ignition key switch SWig is off, the CPU 11 substantially refrains from performing the processings of "sitting state monitoring". If the ignition key switch SWig is switched from off to on, the CPU 11 writes a number "1" indicative of the start of "sitting state monitoring" into a register MSF (STEPS 1 through 3) and checks whether or not the sitting state sensor SWse is on (whether or not there is a passenger sitting on the cushion SEc) (STEP 5).

Figure 4:
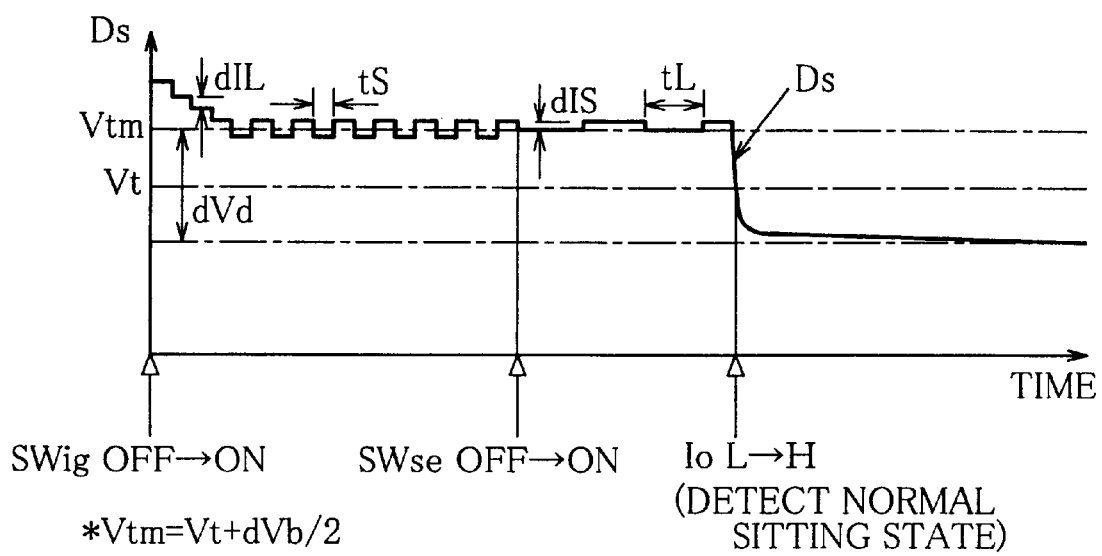
FIG. 4 is a time chart showing overall changes in output level Ds of a wave detector circuit 13d shown in FIG. 2.

If the sitting state sensor SWse is off, the CPU 11 compares the oscillation frequency data Ds with the threshold value Vt (the set value, i.e. the fixed value) and with the standard value Vtm (the set value, i.e. the fixed value) (STEPS 6, 9 and 10). FIG. 4 shows a relation among the oscillation frequency data Ds, the threshold value Vt and the standard value Vtm. The standard value Vtm is a set value which is estimated from the standpoint of design to be the average of the oscillation frequency data Ds. The threshold value Vt is obtained by subtracting dVb/2 from the standard value Vtm. The value dVb is a set value which is estimated to be the average of a difference between the oscillation frequency data Ds when the passenger has his or her back in close contact with the seat back SEb and the oscillation frequency data Ds when the back is apart from the seat back SEb at a distance equal to or greater than a predetermined distance. In a state where the sensor circuit 13 is adjusted (corrected) so that the oscillation frequency data Ds substantially assume the standard value Vtm, if the passenger has his or her back in close contact with the seat back SEb, the oscillation frequency data Ds rapidly change substantially from the standard value Vtm to the value (Vtm−dVb). At this moment, the oscillation frequency data Ds change across the threshold value Vt, and the monitoring result of the CPU 11 changes from the absence of a normal position to the presence of a normal position. In other words, the monitoring result of the CPU 11 changes from an abnormal sitting posture (Io=L) to a normal posture (Io=H).

Reference will again be made to FIG. 3. When the sitting state sensor SWse is off (when there is no sitting passenger), the oscillation frequency data Ds are compared with the threshold value Vt and with the standard value Vtm (STEPS 6, 9 and 10). If Ds≦Vt, the sitting state sensor SWse has not detected the presence of a passenger. However, the antenna ATs detects the presence of the passenger and estimates that there occurs an abnormality. Thus, the CPU 11 outputs an output signal Ia of H and lights up the light-emitting diode 15 (STEPS 6, 7). In this case as well as the case of Ds<Vtm, the data Ds assume a value smaller than the standard value Vtm. Therefore, in order to increase the value of Ds, the CPU 11 greatly updates data If indicative of the control voltage Vf by a relatively great value dIL. Then, the CPU 11 sets a judgment output Io to a value L indicative of the absence of detection of a normal posture, and writes a short-time value tS into a timer-value register Ti (STEPS 6 through 9, 13, 14). If Ds>Vtm, the data Ds assume a value greater than the standard value Vtm. Therefore, in order to reduce the value of Ds, the CPU 11 slightly updates data If indicative of the control voltage Vf by a relatively great value dIL. Then, the CPU 11 sets the judgment output Io to a value L indicative of the absence of detection of a normal posture, and writes a short-time value tS into the timer-value register Ti (STEPS 9 through 11, 13, 14). Then, the CPU 11 writes a value "0" indicative of the performance of a clocking operation into a register IEF and starts a timer Ti whose time limit value is equal to a value indicated by data Ti in the register Ti. In this manner, the CPU 11 permits interruption of the timer (STEPS 23 through 25).

If interruption of the timer is permitted, the CPU 11 carries out interruption of the timer as soon as the timer Ti runs out of time (as soon as measurement of the time limit value Ti is completed), and writes a value "1" indicative of an out-of-time state into the register IEF. The CPU 11 proceeds to the "sitting state monitoring" in FIG. 3 at predetermined intervals. Hence, in the "sitting state monitoring" immediately after the performance of the aforementioned interruption handling, the CPU 11 has data indicative of "1" in the register IEF. Thus, the CPU 11 passes through STEPS 1 through 4 and then proceeds from STEP 4 to STEP 5. If the data in the register IEF indicate "0" (if the timer Ti has not run out yet) when the CPU 11 proceeds to the "sitting state monitoring", the CPU 11 passes through STEPS 1 through 4. Because the data in the register IEF indicate "0" in STEP 4, the CPU 11 then gets out of the "sitting state monitoring" and substantially refrains from performing the processings for monitoring a sitting state (STEPS 5 through 25).

Thus, while the sitting state sensor SWse is off (while there is no sitting passenger), the CPU 11 repeats an updating operation at intervals of a relatively short period tS. The updating operation is performed to update data If indicative of the control voltage Vf by a great value dIL so that the oscillation frequency data Ds in STEPS 6 through 14 assume a value close to the standard value Vtm. That is, the oscillation frequency data Ds are adjusted in level (corrected) at a high speed (at intervals of a short period tS and with a great change amount dIL).

If the sitting state sensor SWse is turned on (if a passenger sits on the seat), the CPU 11 proceeds from STEP 6 to STEP 15, and compares the oscillation frequency data Ds with the threshold value Vt and with the standard value Vtm (the set value, i.e. the fixed value) (STEPS 15, 16 and 18).

When the sitting state sensor SWse is on (in the presence of a sitting passenger), the oscillation frequency data Ds are compared with the threshold value Vt and with the standard value Vtm (STEPS 15, 16 and 18). If Ds≦Vt, the passenger has his or her back resting at a suitable position on the seat back SEb. Thus, it is judged that a normal posture has been detected, and the CPU 11 outputs an output signal Ia of H so that the output transistor 14 becomes conductive (STEPS 15 and 22). Thereby the signal So changes from H to L. In this case, the CPU 11 writes a value tL indicative of a relatively long period of time into the register Ti (STEP 21) without altering the data If indicative of the control voltage Vf, and performs processings in STEPS 23 through 25 (the setting of interruption). Afterwards, as long as the relation Ds≦Vt is established with the sitting state sensor SWse switched on, the CPU 11 repeatedly performs the processings in STEPS 1, 2–4, 5–15–22–21–23 through 25 at intervals of a long period tL. Throughout this process, the data indicative of the control voltage Vf remain unchanged. In other words, the updating operation is withheld. Therefore, as long as the passenger sits in a normal posture, the oscillation frequency data Ds substantially remain unchanged. Hence, the relation Ds≦Vt continues to be established.

For example, if the passenger in this state hunkers down or rolls over and thus gets his or her back far apart from the seat back SEb, the value of the oscillation frequency data Ds increases approximately by dVb so that the relation Ds>Vt is established. Then, the CPU 11 proceeds from STEP 15 to STEP 16 and outputs an output signal Ia of L so that the output transistor 14 becomes non-conductive (STEP 20). Thereby the signal So changes from L to H. If the relation Ds<Vtm is established as a result of the comparison of Ds with the standard value Vtm, the value Ds is smaller than the standard value Vtm. Therefore, in order to increase the value of Ds, the CPU 11 greatly updates the data If indicative of the control voltage Vf by a relatively small value dIS. Then, the CPU 11 writes a long time value tL into the time-value register Ti (STEPS 16, 17–20, 21). If Ds>Vtm, the value Ds is greater than the standard value Vtm. Therefore, in order to reduce the value of Ds, the CPU 11 slightly updates the data If indicative of the control voltage Vf by a relatively small value dIS. Then, the CPU 11 writes a long time value tL into the timer-value register Ti (STEPS 18 through 21). Then, the CPU 11 writes a value "0" indicative of the performance of clocking operation into the register IEF and starts the timer Ti whose time limit value is equal to a value indicated by data Ti in the register Ti. In this manner, the CPU 11 permits interruption of the timer (STEPS 23 through 25).

Afterwards, as long as the relation Ds>Vt is established with the sitting state sensor SWse switched on, the CPU 11 repeatedly performs the processings in STEPS 16 through 21–23 through 25 at intervals of a long period tL. In order to ensure that the oscillation frequency data Ds assume a value close to the standard value Vtm, the data If indicative of the control voltage Vf are gradually changed by a small value dIS at intervals of a long period tL. Thus, while the relation Ds>Vt is established with the sitting state sensor SWse switched on (in the presence of a sitting passenger), the CPU 11 repeats an updating operation at intervals of a long period tL. The updating operation is performed to update data If indicative of the control voltage Vf by a small value dIS so that the oscillation frequency data Ds in STEPS 6 through 14 assume a value close to the standard value Vtm. That is, the oscillation frequency data Ds are adjusted in level (corrected) at a low speed (at intervals of a long period tL and with a small change amount dIS).

The relations tL>tS and dIS<dIL are established. The value dIS is approximately equal to a value that changes the oscillation frequency data Ds to the minimum possible extent. The value dIL is an integer multiple of the value dIS.

If there is no passenger sitting on the seat SE when the ignition key switch SWig is on and if a passenger thereafter sits on the seat SE, the oscillation frequency data Ds change as indicated by a solid line in FIG. 4, owing to the function of the CPU 11 that has been described. While there is no passenger sitting on the seat cushion SEc, the data If indicative of the control voltage Vf are changed by the great value dIL at intervals of the short period tS so that the oscillation frequency data Ds are adjusted (corrected) to the standard value Vtm. Thus, the oscillation frequency data Ds converge to the standard value Vtm at a high speed. In the meantime, even if the oscillation frequency data Ds greatly change at a high speed, the sitting state sensor SWse is off (in the absence of a sitting passenger). Hence, there is no need to detect the presence of a normal posture by means of the antenna ATs, and no problem is caused.

If the sitting state sensor SWse is on (in the presence of a sitting passenger), the change in the oscillation frequency data Ds when the back of the passenger moves from a position far from the seat back SEb to a suitable position thereon may be canceled. For this reason, the oscillation frequency data Ds are modified (corrected) at a much lower speed.

Because the oscillation frequency data Ds are modified (corrected) as described above, even if the capacitance of the antenna ATs fluctuates due to environmental changes such as changes in humidity, water leakage and desiccation, it is possible to reliably detect whether or not the passenger has his or her back resting at a suitable position on the seat back SEb, by monitoring changes in capacitance of the antenna ATs.

[Second Embodiment]

Figure 5:
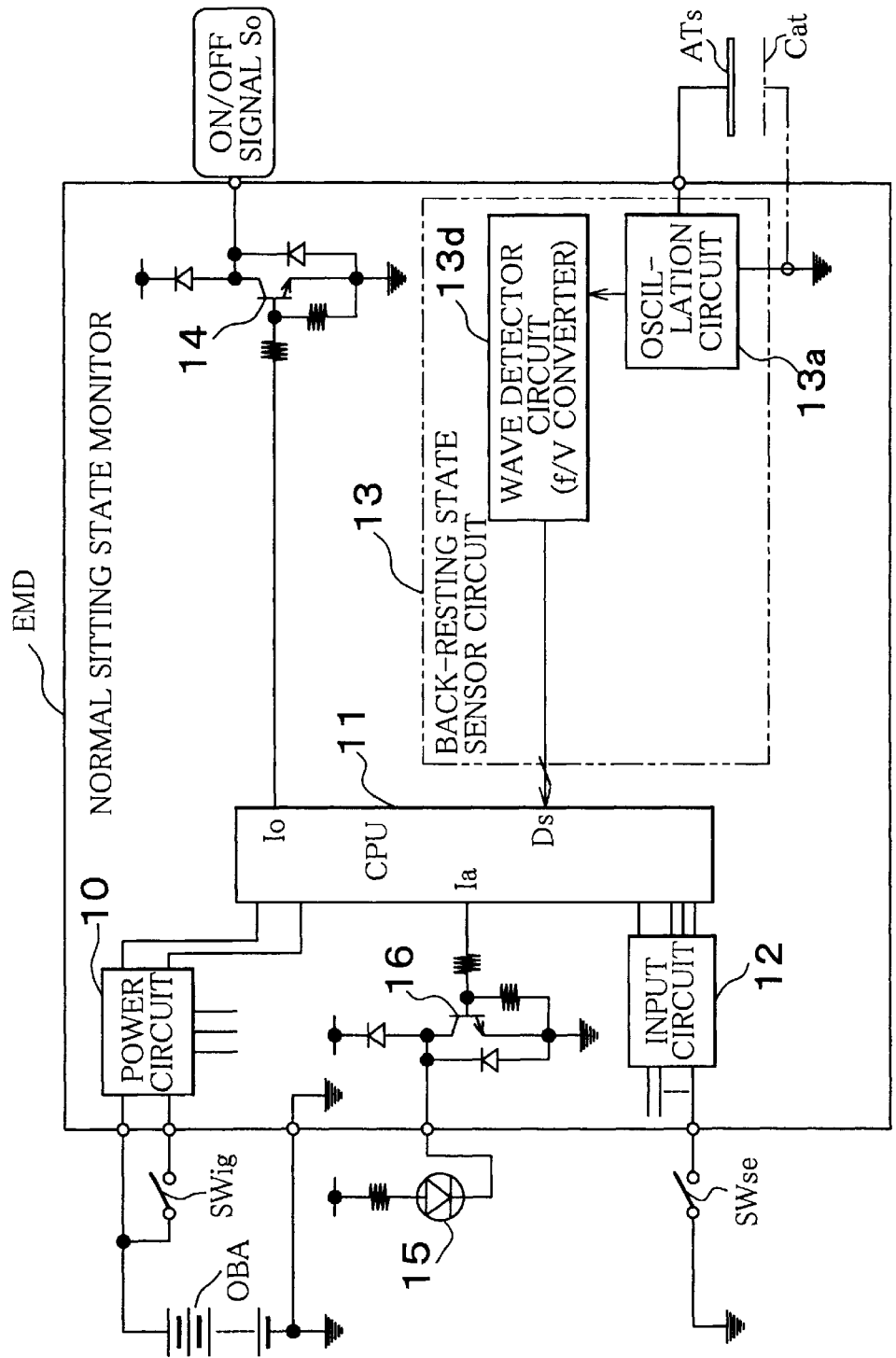
FIG. 5 is a block diagram of a construction in accordance with a second embodiment of the present invention.

FIG. 5 shows a second embodiment of the present invention. Also in the second embodiment, the oscillation frequency data Ds are compared with the threshold value Vt to detect whether or not the passenger has his or her back resting at a suitable position on the seat back SEb. However, the threshold value Vt is adjusted without modifying changes in oscillation frequency data Ds resulting from environmental changes around the antenna ATs. The CPU 11 is not required to constantly adjust an oscillation frequency (to modify the aforementioned data Ds). Therefore, an oscillation circuit whose oscillation frequency changes only in accordance with a capacitance between the antenna ATs and the ground electrode Cat is used as the oscillation circuit 13.

FIG. 6 shows the overall processings of "sitting state monitoring" performed by the CPU 11. While the ignition key switch SWig is off, the CPU 11 substantially refrains from performing the processings of "sitting state monitoring". If the ignition key switch SWig is switched from off to on, the CPU 11 writes a number "1" indicative of the start of "sitting state monitoring" into the register MSF (31 through 33) and checks whether or not the sitting state sensor SWse is on (whether or not there is a passenger sitting on the cushion SEc) (34). The CPU 11 sets an output Io to H if the sensor SWse is on, and to L if the sensor SWse is off (35, 36). Then the CPU 11 writes one-n-th of the oscillation frequency data value Ds at this moment into n registers RDs1 through RDsn (37). Then, the sum ΣRdsi(= Ds) of data (Ds/n) in the registers RDs1 through RDsn is multiplied by a constant A satisfying the relation 0<A<1 (a set value, i.e. a fixed value approximately equal to 0.8). The CPU 11 sets the obtained value A·ΣRDsi as a first threshold value Vt (38).

Afterwards, while the sitting state sensor SWse is off, the CPU 11 reads the oscillation frequency data Ds at intervals of Ti=tS and updates the first threshold value Vt. Further, the CPU 11 sets the first threshold value Vt+dVb/2 to a second threshold value. That is, the CPU 11 transfers data in the register RDs2 to the register RDs1, data in the register RDs3 to the register RDs2, ... and data in the register RDsn to the register RDs(n−1). In this manner, the CPU 11 transfers the data in the n registers RDs1 through RDsn (data shift for the registers RDs1 through RDsn: STEP 44). The CPU 11 writes a value Ds/n which is equal to one-n-th of the currently read data value Ds into the last register RDsn (STEP 45). The CPU 11 updates and sets a value A·ΣRDsi, which is obtained by multiplying the sum ΣRDsi of the data in the registers RDs1 through RDsn by a coefficient A, as the first threshold value Vt. Accordingly, the CPU 11 updates and sets the first threshold value Vt+dVb/2 as the second threshold value.

Figure 7A:
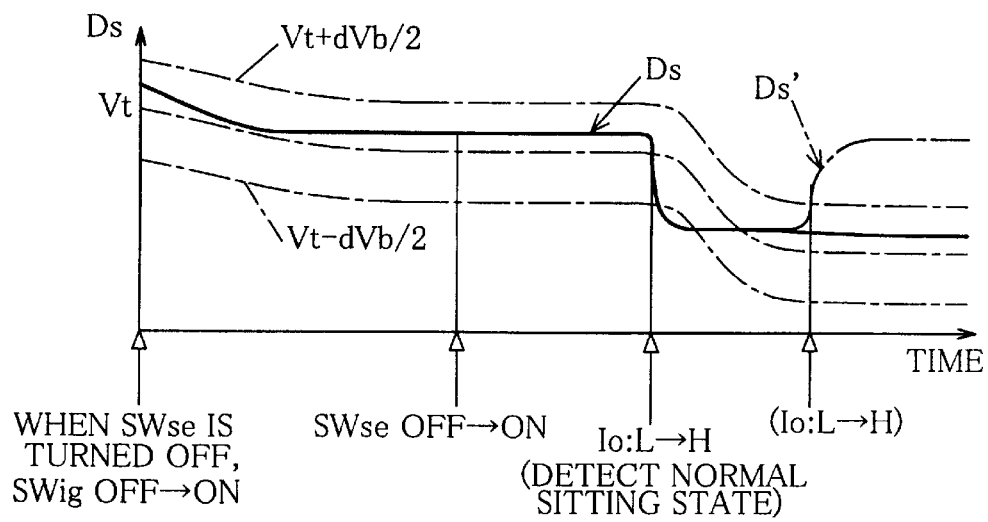
FIGS. 7A and 7B are time chart showing overall changes in output level Ds of a wave detector circuit 13d shown in FIG. 5.

The aforementioned updating operations for the threshold values are repeated at intervals of Ti=tS, whereby the first threshold value Vt becomes equal to the time-series average ΣRDsi of the oscillation frequency data Ds multiplied by A(0.8). However, since the time-series average ΣRDsi is a time-series average for a period of t×S×n, it is considerably retarded with respect to the current oscillation frequency data Ds. That is, the first threshold value Vt is a value which is obtained by multiplying the value of Ds that has just been obtained by A. Thus, if a passenger sits on the seat SE and has his or her back resting on the seat back SEb, the value of the oscillation frequency data Ds decreases rapidly as shown in FIG. 7A. However, the first threshold value Vt and the second threshold value (Vt+dVb/2) decrease gently.

If the value of the oscillation frequency data Ds becomes smaller than the first threshold value Vt, the CPU 11 outputs an output signal Io of H indicative of the presence of a normal posture (STEPS 40–51–53). Upon such detection of a normal posture, the CPU 11 skips (cancels) the updating operations of the threshold value (STEPS 56 through 58), and monitors at intervals of Ti=tL whether or not the passenger is out of a normal posture (whether or not the passenger has his or her back far apart from the seat back SEb) (STEPS 40–5–53–55–59–48 through 50).

If the value of the oscillation frequency data Ds becomes greater than the first threshold value Vt as indicated by Ds' in FIG. 7A, the CPU 11 checks whether or not the value of the oscillation frequency data Ds has become equal to or greater than the second threshold value+dVb/2 (STEPS 51, 52). If the value of the oscillation frequency data Ds becomes equal to or greater than the second threshold value, the CPU 11 judges that the passenger is no longer in a normal posture, and outputs an output signal Io of L indicative of the absence of a normal posture (STEP 54). While the output Io is thus at L, as long as the sitting state sensor SWse is on (as long as there is a sitting passenger), the CPU 11 reads the oscillation frequency data Ds at intervals of Ti=tL to update the first threshold value, and sets the first threshold value Vt+dVb/2 as the second threshold value. That is, the CPU 11 shifts data in the n registers RDs1 through RDsn (STEP 56), and writes the value Ds/n which is obtained by dividing the currently read data value Ds by n into the last register RDsn (STEP 57). The CPU 11 updates and sets the value A·ΣRDsi, which is obtained by multiplying the sum ΣRDsi of the data in the registers RDs1 through RDsn by the coefficient A, as the first threshold value. Accordingly, the CPU 11 updates and sets the first threshold value Vt+dVb/2 as the second threshold value.

The aforementioned updating operations for the threshold values are repeated at intervals of Ti=tL, whereby the first threshold value Vt becomes equal to the time-series average ΣRDsi of the oscillation frequency data Ds multiplied by A(0.8). However, since the time-series average ΣRDsi is a time-series average for a period of t×L×n, it is considerably retarded with respect to the current oscillation frequency data Ds. Thus, if a passenger has his or her back resting on the seat back SEb, the value of the oscillation frequency data Ds decreases rapidly. However, the first threshold value Vt and the second threshold value (Vt+dVb/2) decrease gently. Because tL is a multiple of tS, the first and second threshold values change relatively gently in accordance with changes in the oscillation frequency data Ds. Thus, there is no possibility of overlooking changes in the oscillation frequency data Ds when the back of the passenger comes into or out of contact with the seat back.

Figure 7B:
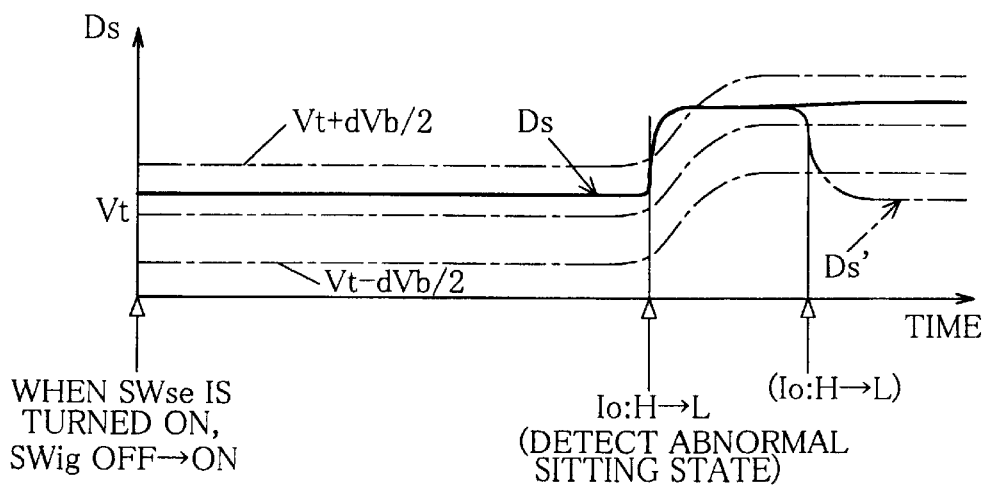

FIG. 7B shows changes in the oscillation frequency data Ds in the case where there is a passenger on the seat SE before the ignition key switch SWig is turned on and where the passenger has his or her back in contact with the seat back SEb. If the passenger gets his or her back far apart from the seat back SEb, the value of the oscillation frequency data Ds rises rapidly and exceeds the second threshold value (Vt+dVb/2). If the back comes into contact with the seat back SEb, the value of the oscillation frequency data Ds decreases rapidly and becomes smaller than the first threshold value as indicated by Ds' in FIG. 7B.

As described hitherto, also in the second embodiment, the first and second threshold values are updated at a high speed (at intervals of a short period tS) when the sitting state sensor SWse is off (in the absence of a sitting passenger), and the first and second threshold values are updated at a low speed (at intervals of a long period tL) when the sitting state sensor SWse is on (in the presence of a sitting passenger) with a normal posture of the passenger undetected (Io:L).

[Third Embodiment]

Figure 8:
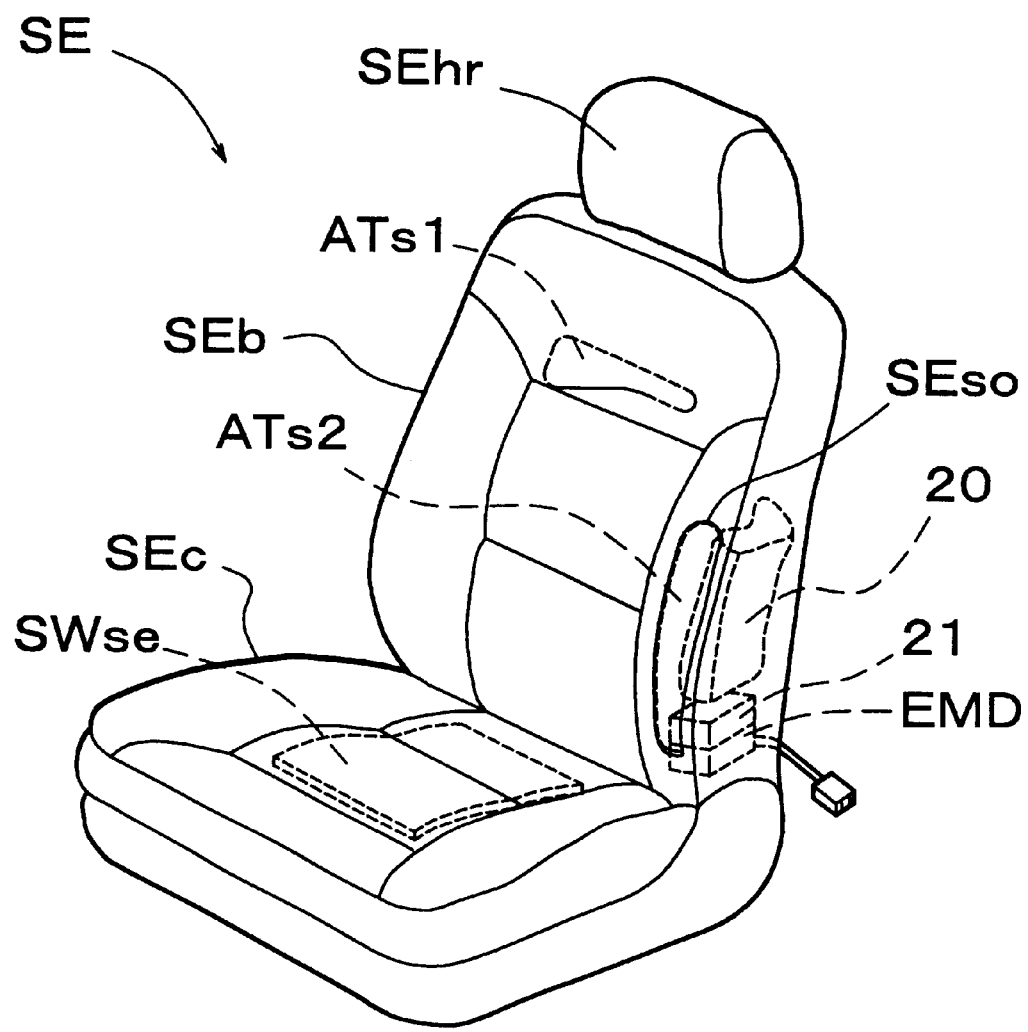
FIG. 8 is a perspective view of an external appearance of another vehicular seat to which the present invention is applied.

FIG. 8 shows an external appearance of a front seat SE (a front-left seat) which is located next to a driver seat and which is to be monitored in accordance with a third embodiment of the present invention. A first antenna electrode ATs1 is stuck to the back of a skin of a seat back SEb. A second antenna electrode ATs2 is stuck to the back of a cover which is located at a left end of the seat back SEb and which closes an opening SEso for the swelling of the air bag. The structure of the seat SE shown in FIG. 8 is the same as that of the seat SE shown in FIG. 1 in other respects.

Figure 9:
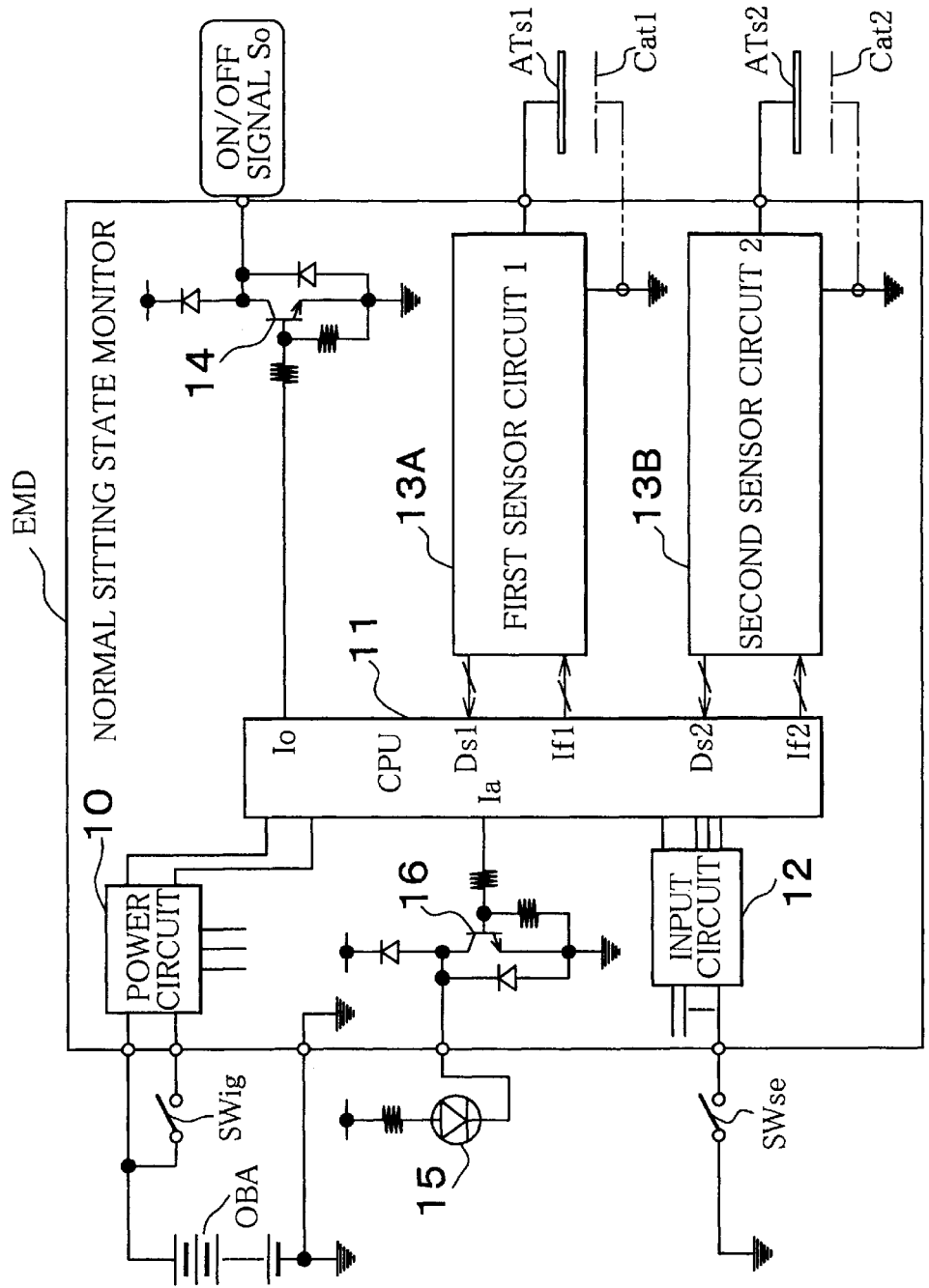
FIG. 9 is a block diagram of a construction in accordance with a third embodiment of the present invention.

FIG. 9 shows the structure of a sitting state monitor EMD in accordance with the third embodiment which is integrated into the seat SE shown in FIG. 8. In the third embodiment, a first sensor circuit 13A is connected to the first antenna electrode ATs1, and a second sensor circuit 13B is connected to the second antenna electrode ATs2. The first and second sensor circuits 13A, 13B are constructed and function in the same manner as the back-resting state sensor circuit 13 shown in FIG. 2. The CPU 11 reads an electric signal from the first sensor circuit 13A through digital conversion at a first A/D conversion input port Ds1. Digital If1, which determine a relation between capacitance and output signal level in the first sensor circuit 13A, are outputted from an output port If1 to the circuit 13A. Also, the CPU 11 reads an electric signal from the second sensor circuit 13B through digital conversion at a second A/D conversion input port Ds2. Digital If2, which determine a relation between capacitance and output signal level in the second sensor circuit 13B, are outputted from an output port If2 to the circuit 13B. The hardware structure of the sitting state monitor EMD shown in FIG. 9 is the same as that shown in FIG. 2 in other respects.

Figure 10:
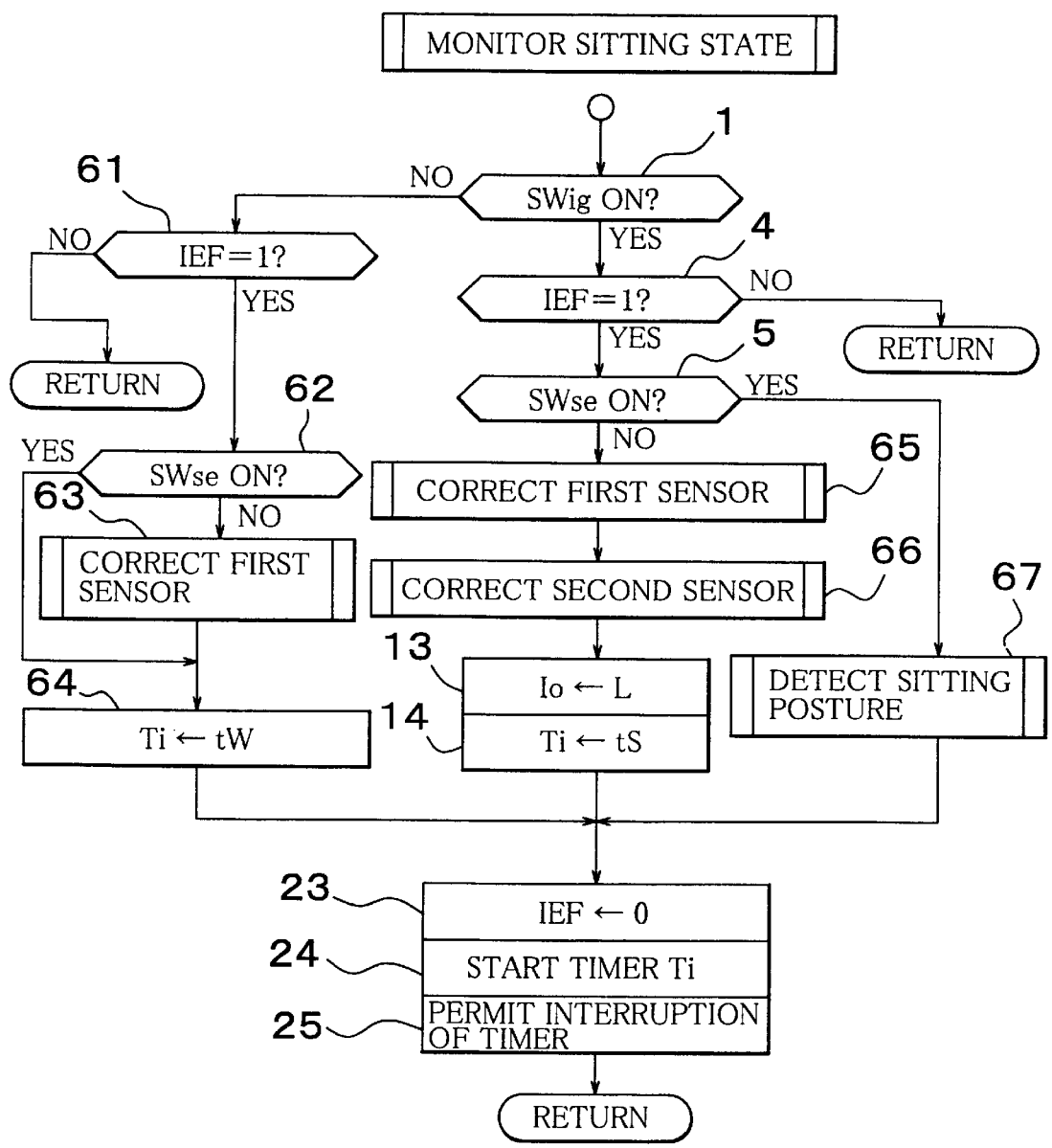
FIG. 10 is a flowchart showing a sitting state monitoring function of a CPU 11 shown in FIG. 9.

FIG. 10 shows the overall processings of "sitting state monitoring" performed by the CPU 11 shown in FIG. 9.

While the ignition key switch SWig is off, the sitting state switch SWse, which serves as a third sensor in the CPU 11, checks whether there is a sitting passenger (on) or not (off) at intervals of tW (e.g. 10s). When there is no sitting passenger (off), "correction of the first sensor" 63 is carried out. On the other hand, when there is a sitting passenger, no particular processings are performed (STEPS 1–61, 62 through 64, 23 through 25). The contents of "correction of the first sensor" 63 are the same as the contents of later-described "correction of the first sensor" 65 and thus will not be described below.

While the ignition key switch SWig is off (the vehicle is stopped) and the sitting state switch SWse detects the absence of a passenger, the "correction of the first sensor" 63 is repeatedly carried out at intervals of tW. Therefore, if the capacitance of the first antenna electrode ATs1 of the seat back SEb changes, for example, due to changes in humidity or adhesion of waterdrops to the skin to such an extent that the output signal level (Ds1) of the first sensor circuit 13A shifts, the data If1 for the output port If1 are changed so that the output signal level (Ds1) is reset to a set level Vtm1. That is, the output signal level (Ds1) is always corrected to a level suited to detect changes from the presence of a back-resting state to the absence of a back-resting state and vice versa. While the sitting state switch SWse detects the presence of a sitting passenger (on), the correction is not made so as to prevent deterioration of precision for detecting the presence of a back-resting state.

While the ignition key switch SWig is on (the engine is in operation) and the sitting state switch SWse detects the absence of a passenger (off), the "correction of the first sensor" 65 and the "correction of the second sensor" 66 are repeated at intervals of Ti=tS. Because there is no sitting passenger, the output port Io is set to L and the transistor 14 is turned off (STEP 13; deactivation of the air bag) (STEPS 65, 66–13, 14–23 through 25).

Figure 11:
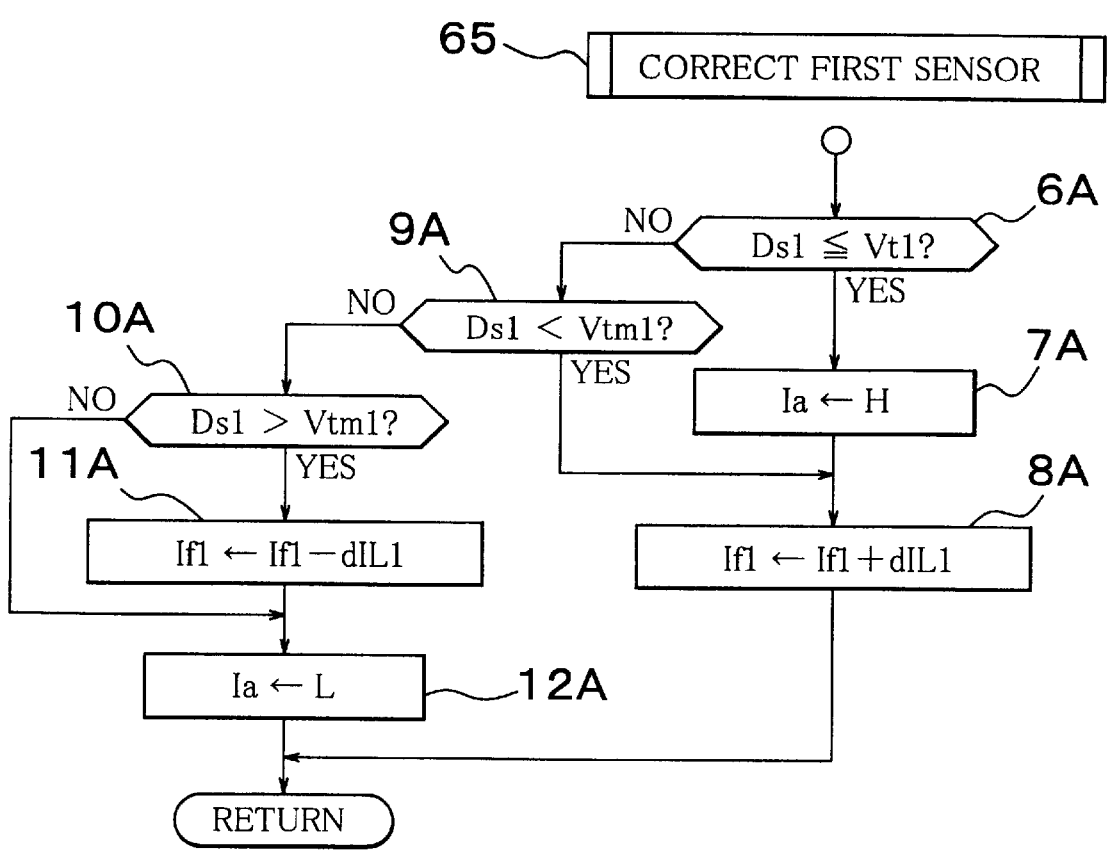
FIG. 11 is a flowchart showing the contents of "correction of a first sensor" 65 shown in FIG. 10.
Figure 12:
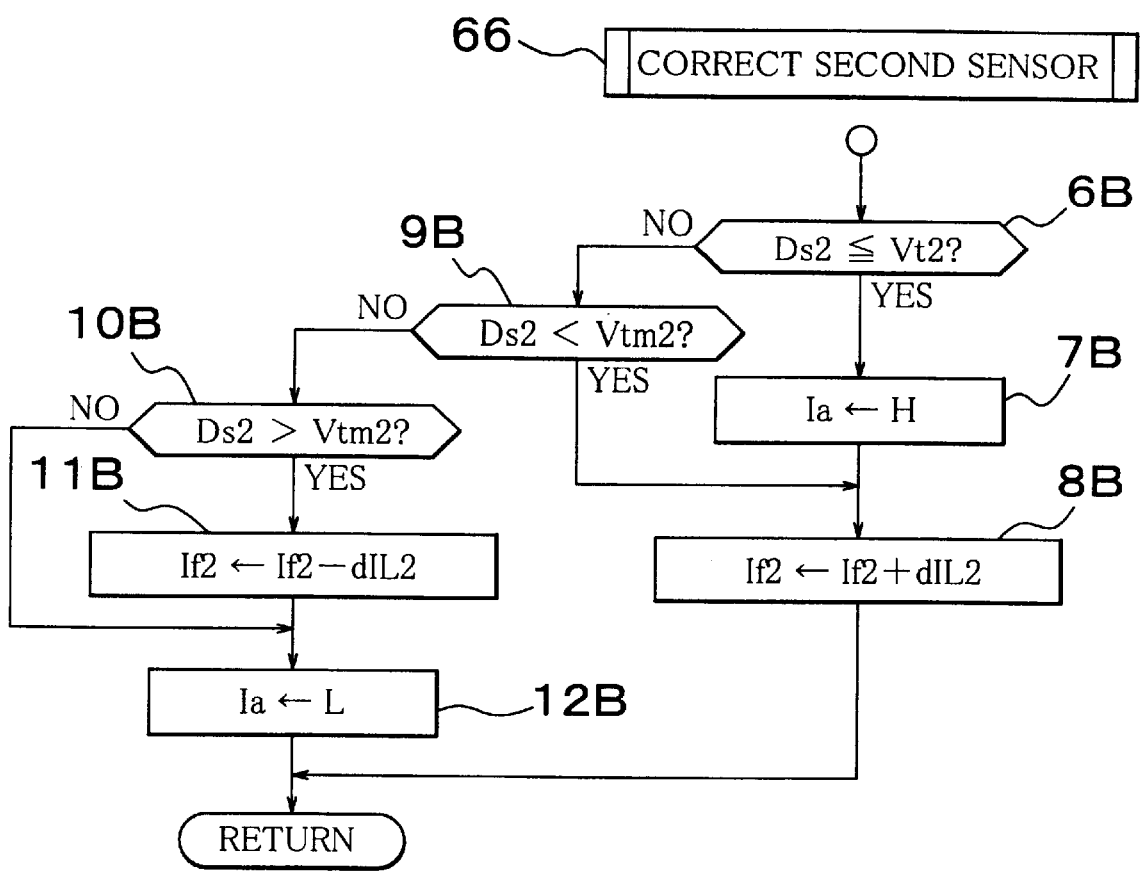
FIG. 12 is a flowchart showing the contents of "correction of a second sensor" 66 shown in FIG. 10.

FIG. 11 shows the contents of the "correction of the first sensor" 65 which determine a relation between capacitance and output signal level in the first sensor circuit 13A. FIG. 12 shows the contents of the "correction of the second sensor" 66 which determine a relation between capacitance and output signal level in the second sensor circuit 13B. These contents are the same as those in STEPS 6 through 12 in FIG. 6 which have been described in relation to the first embodiment.

Reference will again be made to FIG. 10. While the ignition key switch SWig is on (the engine is in operation) and the sitting state switch SWse detects the presence of a sitting passenger (on), the "detection of a sitting posture" 67 is carried out at intervals of Ti=tL.

Figure 13:
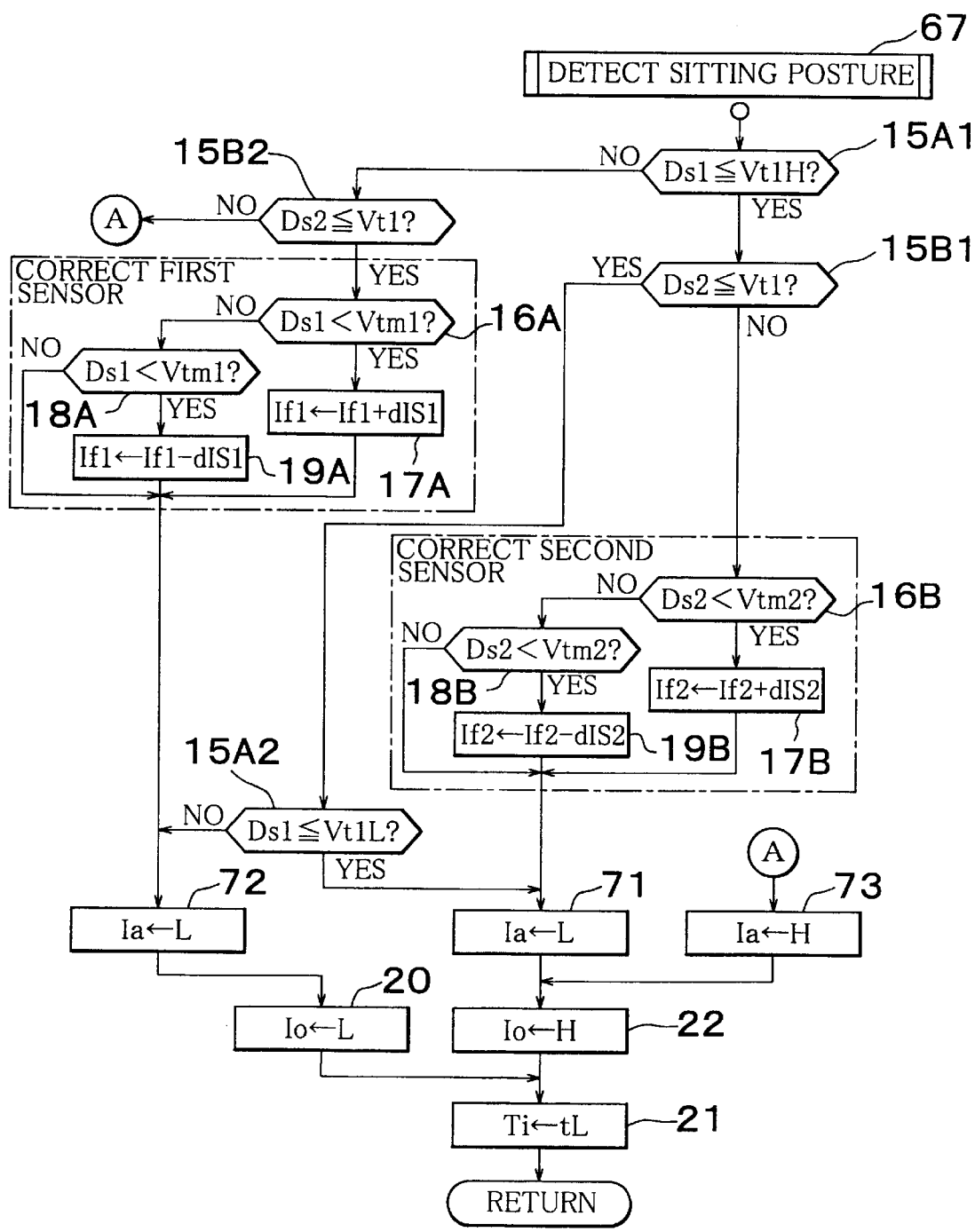
FIG. 13 is a flowchart showing the contents of "detection of a sitting posture" 67 shown in FIG. 10.

FIG. 13 shows the contents of the "detection of a sitting posture" 67. The processings performed herein will be described below.

Case a1.

In the case where the sitting state switch SWse detects the presence of a sitting passenger, where the output voltage level Ds1 of the first sensor circuit 13A is equal to or lower than a sensitive-level threshold value Vt1H and thus indicates detection of a predetermined posture, and where the output voltage level Ds2 of the second sensor circuit 13B is higher than a threshold value Vt2 (Ds2>Vt2: the body of the passenger undetected), the passenger is estimated to be in a suitable (predetermined) posture which is suited for deployment of the side air bag. In this state, the CPU 11 passes through STEPS 15A1, 15B1, 16B through 19B, sets an abnormality output port Ia to L (the absence of an abnormality) (STEP 71), and sets a posture-detection output port Io to H which indicates detection of a normal posture (STEP 22). Thereby the transistor 14 becomes conductive, and it becomes possible for the driver 21 to supply the air bag 20 with electric current for activation (deployment). At the same time, since the body of the passenger is not located close to the second antenna ATs2, the second sensor circuit 13B is corrected (STEPS 16B through 19B). The contents of this correction are substantially identical to the contents of "correction of the second sensor" 66. Because the first sensor circuit 13A has detected a predetermined posture (the presence of the body of a passenger), no correction is made.

Case a2.

In the case where the sitting state switch SWse detects the presence of a sitting passenger, where the output voltage level Ds1 of the first sensor circuit 13A is equal to or lower than the sensuous level threshold value Vt1H and thus indicates detection of a predetermined posture, and where the output voltage level Ds2 of the second sensor circuit 13B is equal to or lower than the threshold value Vt2 (detection of the body of the passenger), the body of the passenger deviates to the side of the second antenna ATs2. However, since the body is also detected on the side of the first antenna ATs1, it is considered for the time being that detection by means of the first sensor circuit 13A is too sensitive. Then the CPU 11 passes through STEPS 15A1 and 15B1 and checks whether or not the output voltage level Ds1 of the first sensor circuit 13A is equal to or lower than an insensitive-level threshold value Vt1L (detection of the body of the passenger) (15A2). Also in this case, if Ds1≦Vt1L, it is considered that the first sensor circuit 13A has a suitable sensitivity and that detection of the body by means of the second sensor circuit 13B is too sensitive. That is, the passenger is estimated to be in a substantially suitable posture. Then the CPU 11 sets the abnormality output port Ia to L (the absence of an abnormality) (STEP 71), and sets the posture-detection output port Io to H which indicates detection of a normal posture (STEP 22). On the contrary, if Ds1>Vt1L, the passenger is estimated to be in an unsuitable posture. Thus, the CPU 11 sets the posture-detection output port Io to L which indicates detection of a postural abnormality (STEP 22). Thereby the transistor 14 becomes non-conductive, and it becomes impossible to for the driver 21 to activate (deploy) the air bag 20.

The sensitive-level threshold value Vt1H, which is to be compared with the detection output level Ds1 of the first sensor circuit 13A, is a value which is smaller than Vtm and greater than Vt shown in FIG. 4. The insensitive-level threshold value Vt1L is a value greater than (Vtm−dVb) and smaller than Vt shown in FIG. 4. The threshold value t2, which is to be compared with the detection output level Ds2 of the second sensor circuit 13B, corresponds to Vt shown in FIG. 4.

Case b.

In the case where the sitting state switch SWse detects the presence of a sitting passenger, where the output voltage level Ds1 of the first sensor circuit 13A is higher than the sensitive-level threshold value Vt1H (a predetermined posture of the passenger undetected), and where the output voltage level Ds2 of the second sensor circuit 13B is equal to or lower than the threshold value Vt2 (detection of the body of the passenger), the passenger is in an abnormal posture (e.g. a child CHL indicated by a solid line in FIG. 14). Thus, the CPU 11 passes through STEPS 15A1, 15B2, 16A through 19A, sets the abnormality output port Ia to L (the absence of an abnormality) (STEP 72), and sets the posture-detection output port Io to L which indicates a postural abnormality (STEP 20). Thereby the transistor 14 becomes non-conductive, and it becomes impossible for the driver 21 to activate (deploy) the air bag 20. Because the first sensor circuit 13A has not detected the body of the passenger, correction of the first sensor is made in STEPS 16A through 19A. The contents of this correction is substantially identical to the contents of "correction of the first sensor" 65. Because the second sensor circuit 13B has detected the presence of the body of the passenger, no correction is made.

Case c.

As described above, while the ignition key switch SWig is on (the engine is in operation) and the sitting state switch SWse detects the absence of a sitting passenger (off), "correction of the first sensor" 65 and "correction of the second sensor" 66 are repeated at intervals of Ti=tS (FIG. 10). Because there is no sitting passenger, the output port Io is set to L and the transistor 14 is turned off (STEP 13; deactivation of the air bag) (STEPS 65, 66–13, 14–23–25 in FIG. 10).

Case d.

Reference will again be made to FIG. 13. In the case where the sitting state switch SWse detects the presence of a sitting passenger, where the output voltage level Ds1 of the first sensor circuit 13A is higher than the sensitive-level threshold value Vt1H (a predetermined posture undetected), and where the output voltage Ds2 of the second sensor circuit 13B is also higher than the threshold value Vt2 (the body undetected), there is a passenger sitting on the seat cushion SEc. However, neither the first sensor circuit 13A nor the second sensor circuit 13B fails to detect the presence of the passenger. That is, the first and second sensor circuits 13A, 13B conclude that there is an object on the seat cushion SEc instead of a passenger, that there occurs an abnormality in the mechanism or detection processings, or that there is no normal state. Thus, the CPU 11 passes through STEPS 15A1, 15B2, outputs H (abnormality) to the output port Ia (STEP 73), and turns the transistor 16 on. Thereby the light-emitting diode 15 is lit up. Furthermore, in consideration of safety (fail-safe), the posture-detection output port Io is set to H (22). Thereby the transistor 14 becomes conductive, and it becomes possible for the driver 21 to supply the air bag 20 with electric current for activation (deployment).

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations which are exemplary, other combinations and configurations, including more, less or only a single embodiment, are also within the spirit and scope of the present invention.

What is claimed is:

1. A sitting state detector comprising:
  a short-range sensor having a short-range detection electrode which is installed in a seat back that supports a back of a passenger and that belongs to a seat having a seat cushion for supporting the passenger thereon and which has a capacitance fluctuating depending on whether or not the back of the passenger is at a predetermined position with respect to the seat back, physical quantity conversion means for generating an electric signal corresponding to the capacitance of the electrode, and detection signal means which detects predetermined changes in the electric signal and which generates a detection signal indicative of whether or not the back of the passenger is at the predetermined position;
  a sitting state sensor which is provided in the seat cushion and which is different from the short-range sensor in passenger detection mechanism; and
  control means for changing an adjustment speed for conversion characteristics of the physical quantity conversion means in accordance with a detection state of the sitting state sensor.

2. The sitting state detector according to claim 1, wherein the control means increases a period for adjusting the conversion characteristics of the physical quantity conversion means and reduces an amount of adjustment if the sitting state sensor detects presence of a sitting passenger, and reduces the period and increases the amount of adjustment if the sitting state sensor detects absence of a sitting passenger.

3. The sitting state detector according to claim 1, wherein the control means refrains from the adjustment of the conversion characteristics of the physical quantity conversion means while there is a signal indicative of a normal position generated by the detection signal generation means.

4. The sitting state detector according to claim 1, wherein the short-range detection electrode is accommodated inside a skin of the seat back.

5. The sitting state detector according to claim 1, wherein the physical quantity conversion means includes an oscillation circuit which oscillates at a frequency corresponding to a capacitance of the short-range detection electrode, means for generating a capacitance detection signal indicative of a voltage proportional to the oscillation frequency, and means for changing the oscillation frequency of the oscillation circuit in accordance with the indicated voltage; and
  the control means adjusts the oscillation frequency at the indicated voltage to adjust the conversion characteristics of the physical quantity conversion means.

6. The sitting state detector according to claim 1, wherein the control means changes the indicated voltage at intervals of a short period by more than an indicated voltage change amount causing changes in unit amount of the capacitance detection signal if the sitting state sensor detects "absence" of a sitting passenger, and changes the indicated voltage at intervals of a long period by the indicated voltage change amount causing changes in unit amount of the capacitance detection signal if the sitting state sensor detects "presence" of a sitting passenger.

7. The sitting state detector according to claim 1, wherein the sitting state sensor is a sitting state sensor which is shaped like a cardboard and which is integrally formed of two thin resin sheets with a relatively thin spacer interposed therebetween;
  conductive foils are joined to the resin sheets;
  the spacer has a plurality of perforations and is joined to the sheets;
  if there is a passenger sitting on the seat cushion, the two thin resin sheets are deflected so that the conductive foils fall into the perforations in the spacer and come into contact with each other; and
  if the passenger gets to his or her feet from the seat cushion, the two thin resin sheets are flattened again owing to their rigidity so that the conductive foils are brought out of contact with each other.

8. A sitting state detector comprising:
a short-range detection electrode which is installed in a seat back that supports a back of a passenger and that belongs to a seat having a seat cushion for supporting the passenger thereon and which has a capacitance fluctuating depending on whether or not the back of the passenger is at a predetermined position with respect to the seat back,
physical quantity conversion means for generating an electric signal corresponding to the capacitance of the electrode;
means which calculates a threshold value based on a time-series smoothened value of the electric signal and which switches, in response to detection of a change in the electric signal across a level of the threshold value, a detection signal indicative of whether or not the passenger is at a normal position;
a sitting state sensor for detecting "presence"/"absence" of an object on the seat cushion; and
control means which performs an updating operation at a high speed through the calculation of the threshold value if the sitting state sensor detects "absence" and which performs an updating operation at a low speed if the sitting state sensor detects "presence".

9. The sitting state detector according to claim 8, wherein the control means refrains from updating of the threshold value while there is a signal indicative of a normal position generated by the detection signal generation means.

10. The sitting state detector according to claim 8, wherein the short-range detection electrode is accommodated inside a skin of the seat back.

11. The sitting state detector according to claim 8, wherein the control means changes the indicated voltage at intervals of a short period by more than an indicated voltage change amount causing changes in unit amount of the capacitance detection signal if the sitting state sensor detects "absence" of a sitting passenger, and changes the indicated voltage at intervals of a long period by the indicated voltage change amount causing changes in unit amount of the capacitance detection signal if the sitting state sensor detects "presence" of a sitting passenger.

12. The sitting state detector according to claim 8, wherein the physical quantity conversion means includes an oscillation circuit which oscillates at a frequency corresponding to a capacitance of the short-range detection electrode and means for generating a capacitance detection signal indicative of a voltage proportional to the oscillation frequency.

13. The sitting state detector according to claim 8, wherein the sitting state sensor is a sitting state sensor which is shaped like a cardboard and which is integrally formed of two thin resin sheets with a relatively thin spacer interposed therebetween;
conductive foils are joined to the resin sheets;
the spacer has a plurality of perforations and is joined to the sheets;
if there is a passenger sitting on the seat cushion, the two thin resin sheets are deflected so that the conductive foils fall into the perforations in the spacer and come into contact with each other; and
if the passenger gets to his or her feet from the seat cushion, the two thin resin sheets are flattened again owing to their rigidity so that the conductive foils are brought out of contact with each other.

14. A sitting state detector comprising:
a first sensor having a short-range detection electrode which is installed in an upper portion of a seat back that supports a back of a passenger and that belongs to a vehicular seat having a seat cushion for supporting the passenger thereon and accommodating in a lateral portion of the seat back a side air bag deployed between a lateral portion of a vehicle body and a lateral portion of the passenger to protect the passenger and which has a capacitance fluctuating depending on whether or not the back of the passenger is at a predetermined position with respect to the seat back, and having physical quantity conversion means for generating an electric signal corresponding to the capacitance of the electrode, the first sensor detecting whether or not the passenger sits in a predetermined posture;
a second sensor which is provided close to a side air bag accommodating portion of the lateral portion of the seat back and which detects whether or not part of a body of the passenger is located close to the side air bag;
a third sensor of load-detection type which is provided in the seat cushion and which detects whether or not there is a sitting passenger; and
judgment means for judging permissibility of activation of the side air bag based on detection signals from the first, second and third sensors.

15. The sitting state detector according to claim 14, further comprising control means for correcting conversion characteristics of the physical quantity conversion means when the third sensor detects absence of a sitting passenger.

16. The sitting state detector according to claim 14, further comprising control means for correcting the conversion characteristics of the physical quantity conversion means when the second sensor detects that part of the body of the passenger is located close to the side air bag.

17. The sitting state detector according to claim 16, wherein in a case where a threshold value which is referred to for the first sensor to detect whether or not there is a passenger sitting in a predetermined posture is set to a sensitive level, when the first sensor detects that the passenger sits in the predetermined posture, the control means sets the threshold value to an insensitive level and again detects by means of the first sensor whether or not there is a passenger sitting in a predetermined posture if the second sensor detects presence of part of a body of the passenger.

18. The sitting state detector according to claim 14, further comprising control means which refers to detection of the third sensor at intervals of a predetermined period while a vehicular ignition key switch is off and which corrects the conversion characteristics of the physical quantity conversion means when the third sensor detects absence of a sitting passenger.

19. A sitting state detector comprising:
a short-range sensor having a short-range detection electrode which is installed in a seat back that supports a back of a passenger and that belongs to a seat having a seat cushion for supporting the passenger thereon and which has a capacitance fluctuating depending on whether or not the back of the passenger is at a predetermined position with respect to the seat back, a physical quantity converter generating an electric signal corresponding to the capacitance of the electrode, and a signal detector detects predetermined changes in the electric signal and which generates a detection signal indicative of whether or not the back of the passenger is at the predetermined position;
a sitting state sensor which is provided in the seat cushion and which is different from the short-range sensor in passenger detection mechanism; and a controller changing an adjustment speed for conversion characteristics of the physical quantity converter in accordance with a detection state of the sitting state sensor.

20. A sitting state detector comprising:

a short-range detection electrode which is installed in a seat back that supports a back of a passenger and that belongs to a seat having a seat cushion for supporting the passenger thereon and which has a capacitance fluctuating depending on whether or not the back of the passenger is at a predetermined position with respect to the seat back, a physical quantity converter generating an electric signal corresponding to the capacitance of the electrode;

a calculator which calculates a threshold value based on a time-series smoothened value of the electric signal and which switches, in response to detection of a change in the electric signal across a level of the threshold value, a detection signal indicative of whether or not the passenger is at a normal position;

a sitting state sensor for detecting "presence"/"absence" of an object on the seat cushion; and a controller performs an updating operation at a high speed through the calculation of the threshold value if the sitting state sensor detects "absence" and which performs an updating operation at a low speed if the sitting state sensor detects "presence".

21. A sitting state detector comprising:

a first sensor having a short-range detection electrode which is installed in an upper portion of a seat back that supports a back of a passenger and that belongs to a vehicular seat having a seat cushion for supporting the passenger thereon and accommodating in a lateral portion of the seat back a side air bag deployed between a lateral portion of a vehicle body and a lateral portion of the passenger to protect the passenger and which has a capacitance fluctuating depending on whether or not the back of the passenger is at a predetermined position with respect to the seat back, and having a physical quantity converter generating an electric signal corresponding to the capacitance of the electrode, the first sensor detecting whether or not the passenger sits in a predetermined posture;

a second sensor which is provided close to a side air bag accommodating portion of the lateral portion of the seat back and which detects whether or not part of a body of the passenger is located close to the side air bag;

a third sensor of load-detection type which is provided in the seat cushion and which detects whether or not there is a sitting passenger; and a controller judging permissibility of activation of the side air bag based on detection signals from the first, second and third sensors.

* * * * *